United States Patent

Yarmchuk et al.

[11] Patent Number: 5,844,742
[45] Date of Patent: Dec. 1, 1998

[54] RADIAL SELF-PROPAGATION PATTERN GENERATION FOR DISK FILE SERVOWRITING

[75] Inventors: Edward John Yarmchuk, Somers; Mark Delorman Schultz, Elmsford; Bucknell C. Webb, Ossining; Timothy Joseph Chainer, Mahopac, all of N.Y.

[73] Assignee: International Business Machines Corporation, Armonk, N.Y.

[21] Appl. No.: 735,924

[22] Filed: Oct. 24, 1996

Related U.S. Application Data

[63] Continuation of Ser. No. 349,028, Dec. 2, 1994, Pat. No. 5,612,833.
[51] Int. Cl.⁶ .................................................. G11B 5/02
[52] U.S. Cl. .................................... 360/75; 360/77.08
[58] Field of Search .................. 360/75, 77.02, 360/77.05, 77.08, 48

[56] References Cited

U.S. PATENT DOCUMENTS

| | | |
|---|---|---|
| 3,881,184 | 4/1975 | Koepcke et al. . |
| 4,414,589 | 11/1983 | Oliver et al. . |
| 5,416,652 | 5/1995 | Lewis ........................................ 360/48 |
| 5,448,429 | 9/1995 | Cribbs et al. ............................. 360/75 |
| 5,541,784 | 7/1996 | Cribbs et al. ............................. 360/75 |

*Primary Examiner*—Aristotelis M. Psitos
*Assistant Examiner*—James L. Habermehl
*Attorney, Agent, or Firm*—Heslin & Rothenberg, P.C.

[57] ABSTRACT

During a write revolution of a storage medium, a transition is written on the storage medium while servoing on another transition previously recorded on the storage medium. During that write revolution, a position error signal corresponding to the position error of the transducer relative to the previously recorded transition is determined. That position error signal is then stored, during the write revolution, to be used in computing a reference track value associated with the transition being written in order to correct for the position error

20 Claims, 15 Drawing Sheets

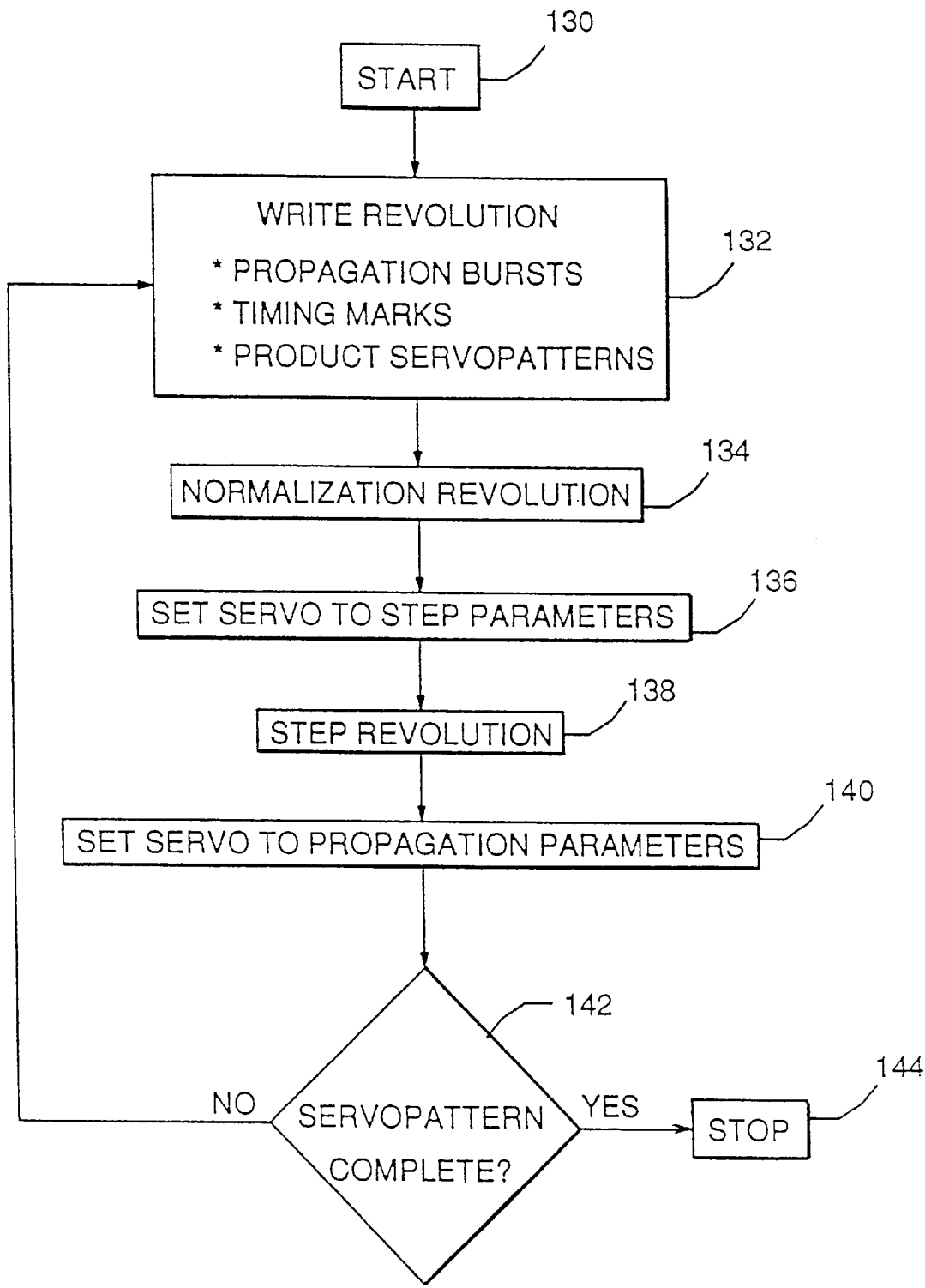

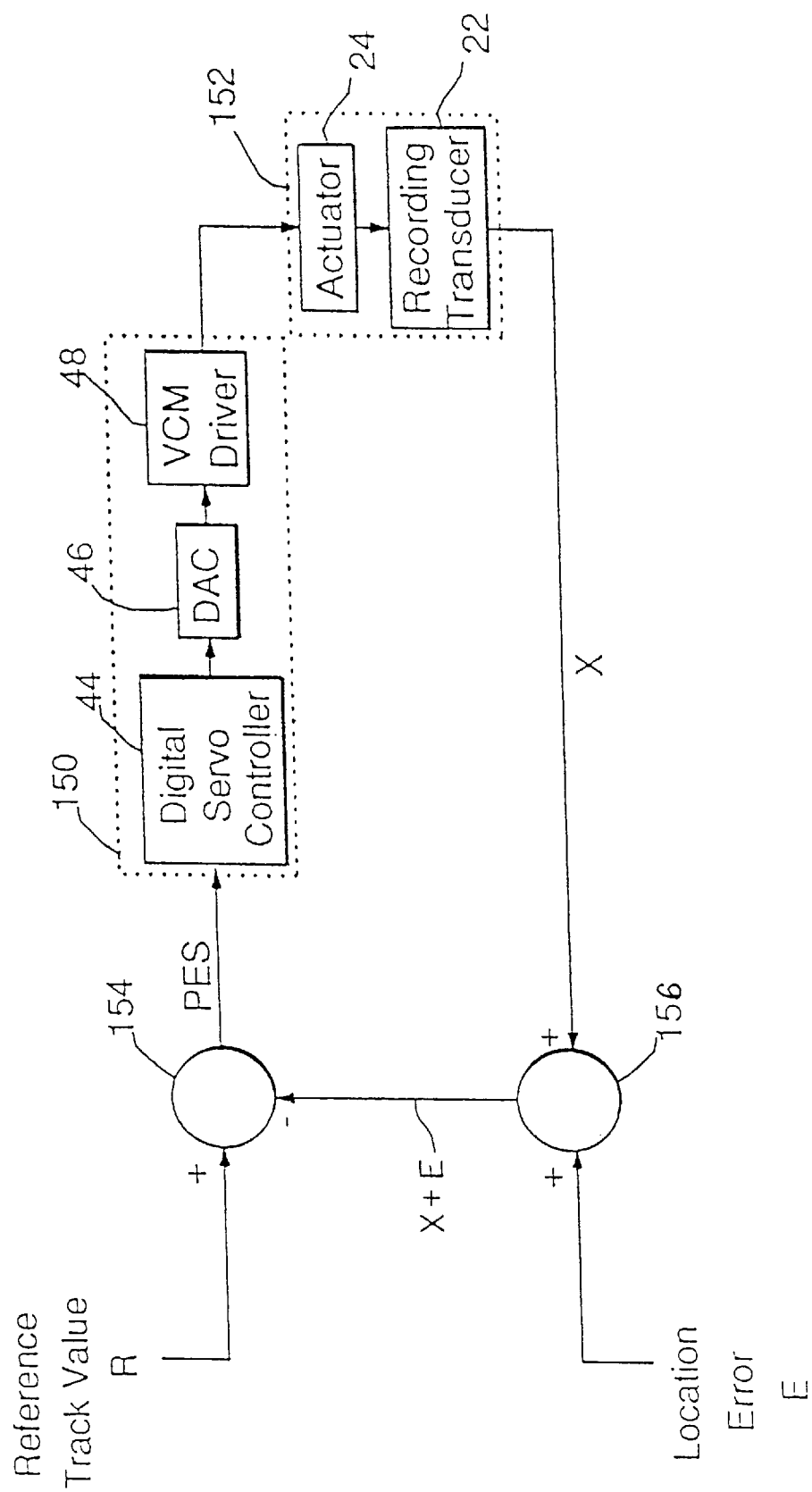

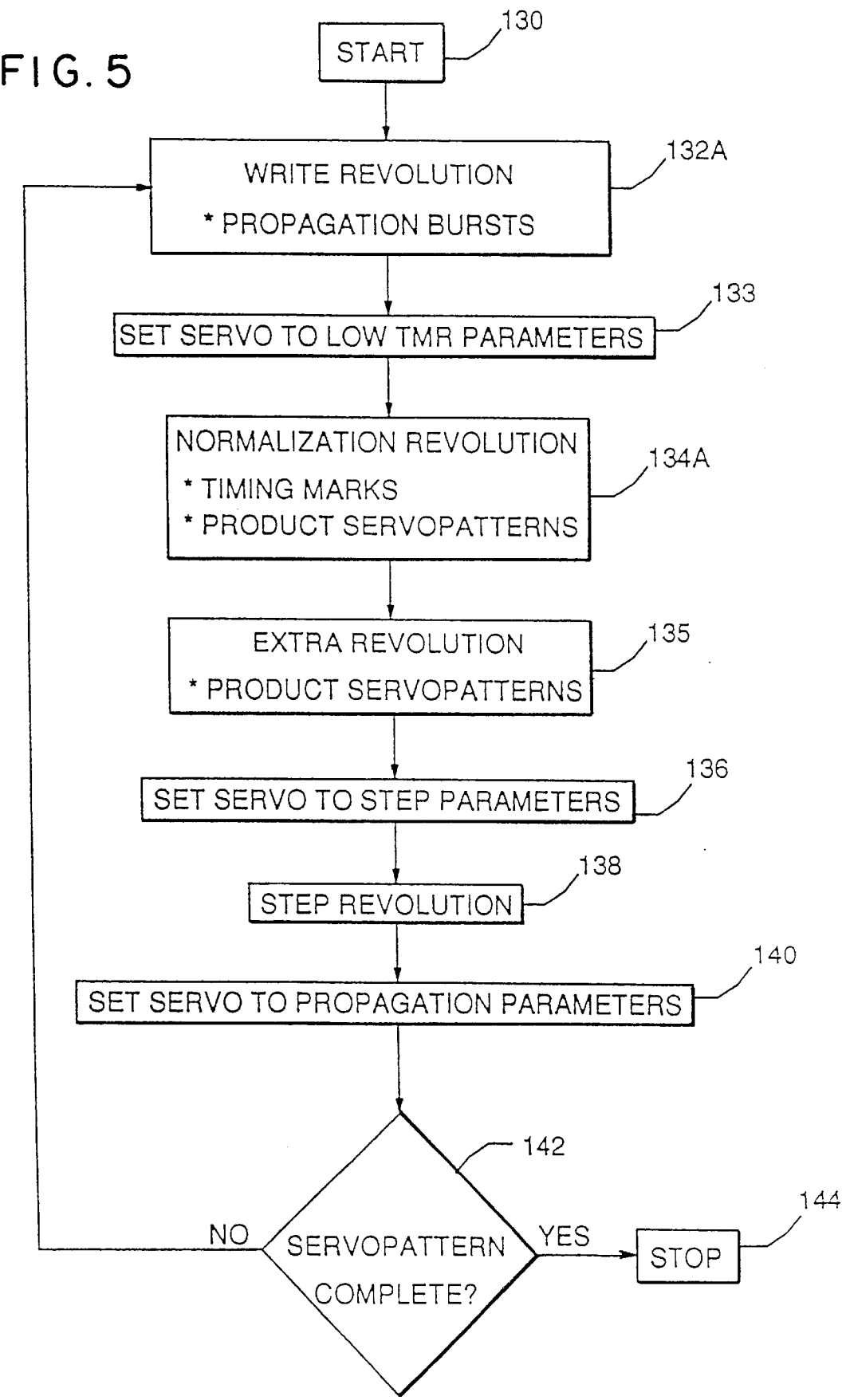

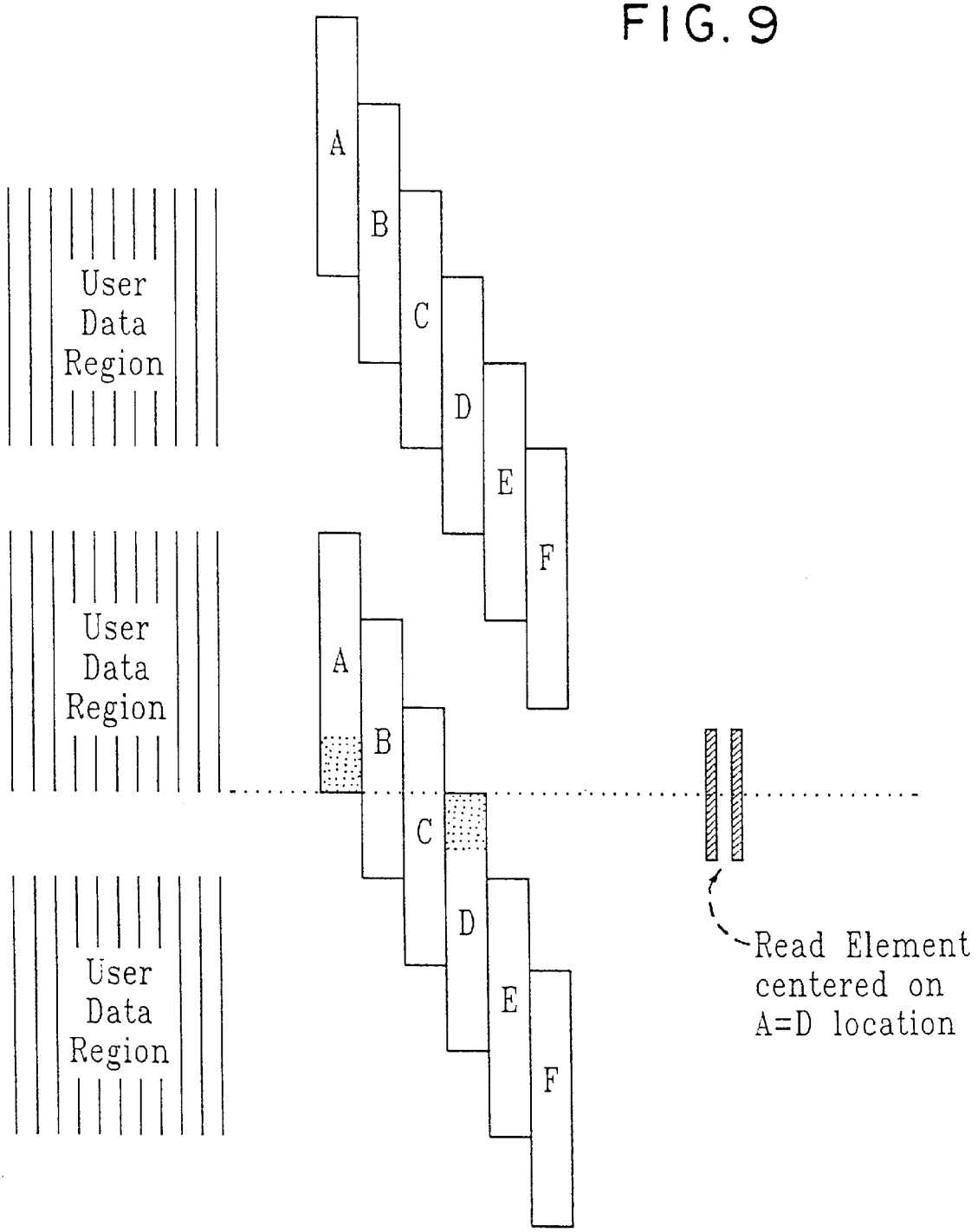

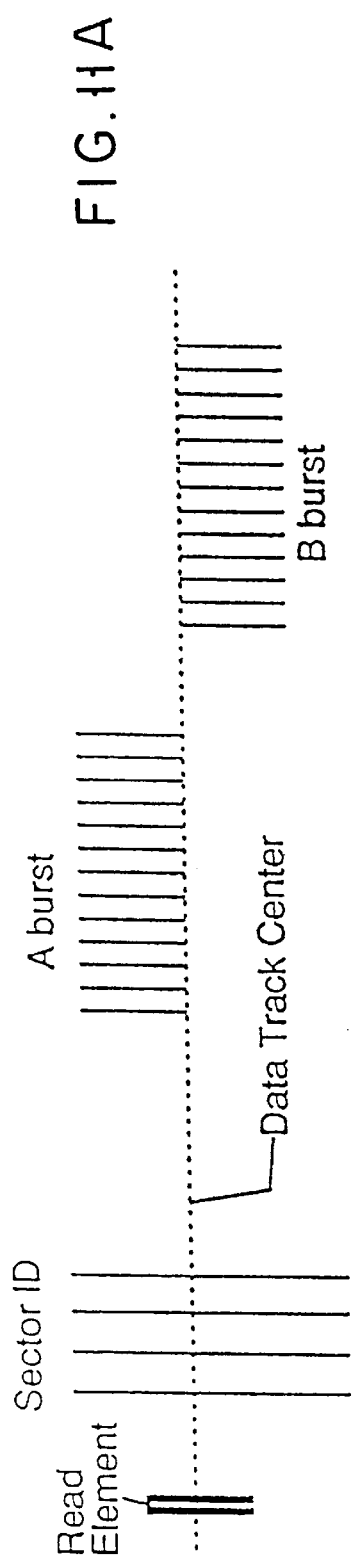
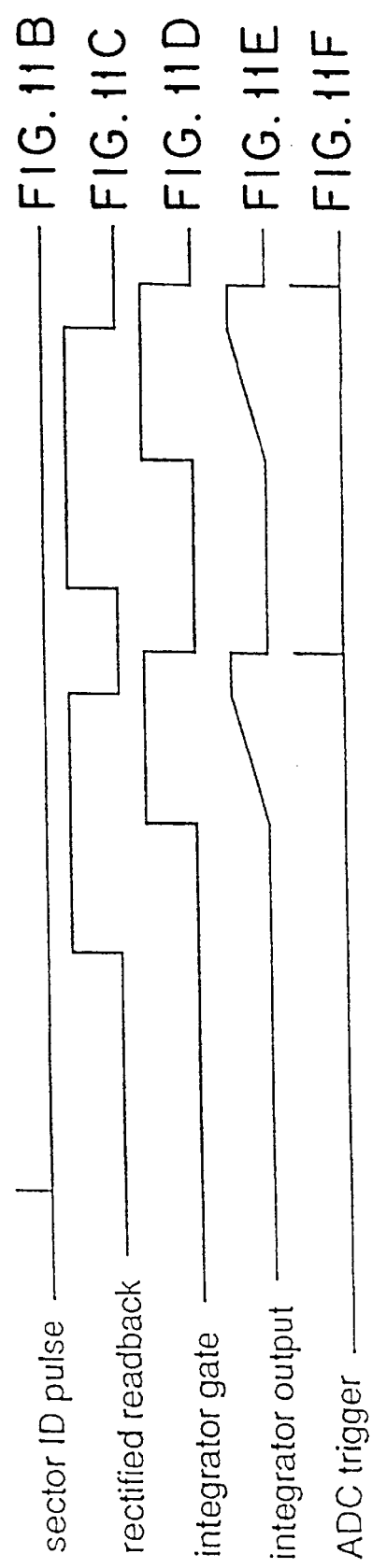

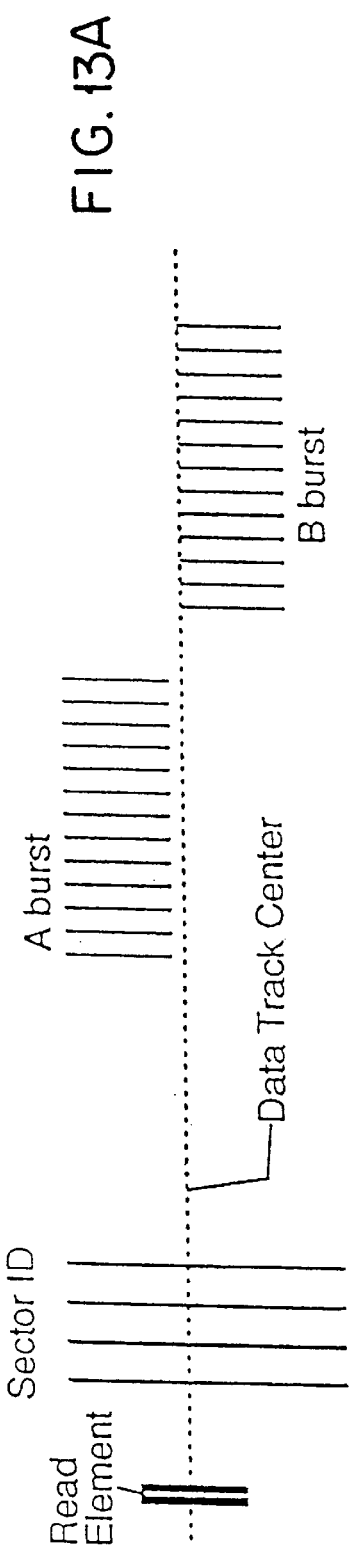
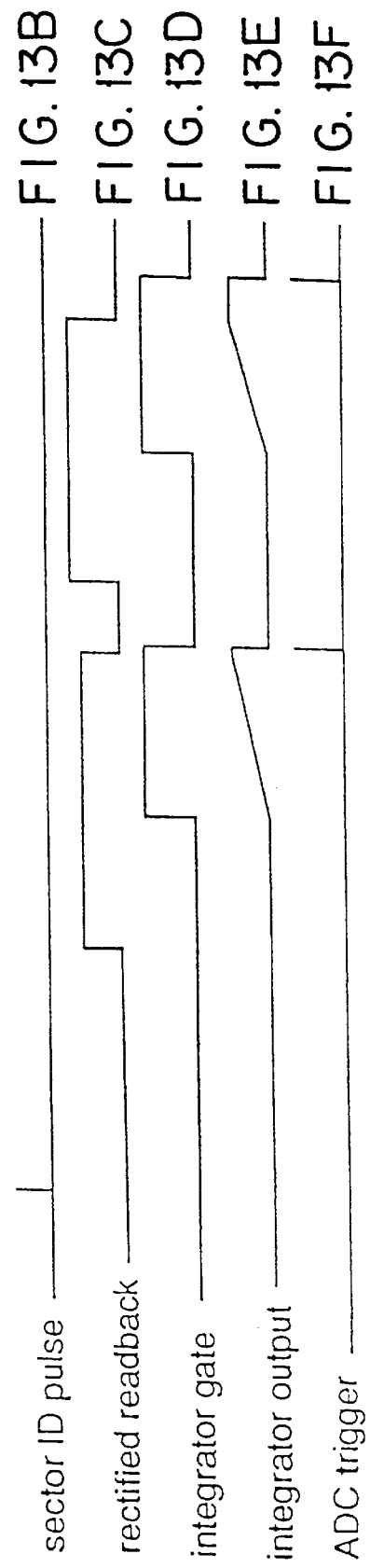
FIG. 13A
FIG. 13B  sector ID pulse
FIG. 13C  rectified readback
FIG. 13D  integrator gate
FIG. 13E  integrator output
FIG. 13F  ADC trigger

RADIAL SELF-PROPAGATION PATTERN GENERATION FOR DISK FILE SERVOWRITING

This application is a continuation of application Ser. No. 08/349,028 filed Dec. 02, 1994 which application is now: U.S. Pat. No. 5,612,833.

BACKGROUND OF THE INVENTION

CROSS REFERENCE TO RELATED APPLICATION

This application is related to U.S. patent application Ser. No. 08/028,044 of T. Chainer et al. filed on Mar. 8, 1993 entitled "A Method and System for Writing a Servo-Pattern on a Storage Medium" commonly assigned herewith, and incorporated herein by reference. It is also related to U.S. patent application Ser. No. 08/348,773 of T. Chainer et al., attorney docket No. Y0994-252, filed on Dec. 1, 1994 and commonly assigned herewith, and is also incorporated by reference.

1. Field of the Invention

The invention relates generally to hard disk drive memory storage devices for computers. More particularly it relates to disk drive apparatus and to a method for writing servotrack information therein. More specifically it relates to alleviating the need for a complex mechanical and/or optical positioning system to establish servopatterns on the recording surfaces of the recording media.

2. General Background Art Relating to Self-servowriting

As described in International Patent Application, WO94/11864, increased levels of storage capacity in floppy and hard disk drives are a direct result of the higher track densities possible with voice-coil and other types of servo positioners as well as the ability to read and write narrower tracks by using, for example, magnetoresistive (MR) head technology. Previously, low track density disk drives were able to achieve satisfactory head positioning with leadscrew and stepper motor mechanisms. However, when track densities are so great that the mechanical error of a leadscrew-stepper motor combination is significant compared to track-to-track spacing, an embedded servo is needed so that the position of the head can be determined from the signals it reads.

Conventional hard disk manufacturing techniques including writing servotracks on the media of a head disk assembly (HDA) with a specialized servowriter instrument. Laser positioning feedback is used in such instruments to read the actual physical position of a recording head used to write the servotracks. Unfortunately, it is becoming more and more difficult for such servowriters to invade the internal environment of a HDA for servowriting because the HDAs themselves are exceedingly small and depend on their covers and castings to be in place for proper operation. Some HDAs are the size and thickness of a plastic credit card. At such levels of microminiaturization, traditional servowriting methods are inadequate.

Conventional servo-patterns typically comprise short bursts of a constant frequency signal, very precisely located offset from a data track's center line, on either side. The bursts are written in a sector header area, and can be used to find the center line of a track. Staying on center is required luring both reading and writing. Since there can be between seventeen to sixty, or even more, sectors per track that same number of servo data areas must be dispersed around a data track. These servo-data areas allow a head to follow a track center line around a disk, even when the track is out of round, as can occur with spindle wobble, disk slip and/or thermal expansion. As technology advances provide smaller disk drives, and increased track densities, the placement of servo data must also be proportionately more accurate.

Servo-data are conventionally written by dedicated, external servowriting equipment, and typically involve the use of large granite blocks to support the disk drive and quiet outside vibration effects. An auxiliary clock head is inserted onto the surface of the recording disk and is used to write a reference timing pattern. An external head/arm positioner with a very accurate lead screw and a laser displacement measurement device for positional feedback is used to precisely determine transducer location and is the basis for track placement and track-to-track spacing. The servo writer requires a clean room environment, as the disk and heads will be exposed to the environment to allow the access of the external head and actuator.

U.S. Pat. No. 4,414,589 to Oliver et al. teaches servowriting wherein optimum track spacing is determined by positioning one of the moving read/write heads at a first limit stop in the range of travel of the positioning means. A first reference track is then written with the moving head. A predetermined reduction number or percentage of amplitude reduction X %, is then chosen that is empirically related to the desired average track density. The first reference track is then read with the moving head. The moving head is then displaced away from the first limit stop until the amplitude of the first reference track is reduced to X % of its original amplitude. A second reference track is then written with the moving head and the moving head is then displaced again in the same direction until the amplitude of the second reference track is reduced to X % of its original value. The process is continued, writing successive reference tracks and displacing the moving head by an amount sufficient to reduce the amplitude to X % of its original value, until the disc is filled with reference tracks. The number of reference tracks so written is counted and the process is stopped when a second limit stop in the range of travel of the positioning means is encountered. Knowing the number of tracks written and the length of travel of the moving head, the average track density is checked to insure that it is within a predetermined range of the desired average track density. If the average track density is high, the disc is erased, the X % value is lowered and the process is repeated. If the average track density is low, the disc is erased, the X % value is increased and the process is repeated. If the average track density is within the predetermined range of the desired average track density, the desired reduction rate X %, for a given average track density, has been determined and the servo writer may then proceed to the servo writing steps.

Unfortunately, Oliver et al. do not disclose how to generate a clock track using the internal recording data heads, as this is achieved by an external clock head. Oliver also do not teach how to determine the track spacing during propagation. This results in the requirement of writing an entire disk surface and counting the number of written tracks to determine the track spacing. Further, Oliver et al. do not examine the variation in the plurality of heads with the disk drive to set the track pitch accordingly. Finally, Oliver et al. do not teach how to limit the growth of errors during the radial propagation growth.

As also described in International Patent Application WO94/11864, a method for writing a servo-pattern with a disk drive's own pair of transducers is described in U.S. Pat. No. 4,912,57 issued Mar. 27, 1990 to Janz. Three of servo-patterns are used to generate three-phase signals that provide a difference signal having a slope that is directly proportional to velocity. Servo-patterns that are substantially wider radially than the nominal track-to-track separation are possible. This helps improve readback amplitudes, and thus servo performance. Janz observes that the signal level from a transducer is a measure of its alignment with a particular pattern recorded on the disk. If the flux gap sweeps only forty percent of a pattern, then the read voltage will be forty percent of the voltage maximum obtainable when the transducer is aligned dead-center with the pattern. Janz uses this phenomenon to straddle two of three offset and staggered patterns along a centerline path intended for data tracks.

In a preferred process, Janz reserves one side of a disk for servo and the other side for data. The disk drive includes two transducers on opposite surfaces that share a common actuator. To format an erased disk for data initialization, a first phase servo is written on the servo side at an outer edge. The transducers are then moved-in radially one half of a track, as indicated by the first phase servotrack amplitude, and a first data-track is recorded on the data side. The transducers are again moved-in radially one half of a track, this time as indicated by the first data-track amplitude, and a second phase servotrack is recorded on the servo side. The transducers are again moved-in radially one half of a track, as indicated by the second phase servotrack amplitude, and a second data-track is recorded on the data side. The transducers are moved-in radially another one half of a track, as indicated by the second data-track amplitude, and a third phase servotrack is recorded on the servo side. The transducers are moved-in radially one half of a track, as indicated by the third phase servotrack amplitude, and a third data-track is recorded on the data side. This back-and-forth progress is repeated until the entire two surfaces are written. If too few or too many tracks were thus written, the disk is reformatted once more, but with a slight adjustment to step inward slightly more or slightly less than one-half a track width, as appropriate. Once the disk drive has been formatted with an entire compliment of properly spaced servotracks, the data-tracks have served their purpose and are erased in preparation for receiving user data.

Unfortunately, the method described by Janz consumes one entire disk surface for servotracks and requires two heads working in tandem. Track-to-track bit synchronism is also not controlled, and seek times to find data between tracks would thus be seriously and adversely impacted. Transducer flying height variations and spindle runout that occur within a single revolution of the disk, and media inconsistencies can and do corrupt radial position determinations that rely on a simple reading of off-track read signal amplitudes. Prior art methods are inadequate for very high performance disk drives.

IBM Technical Disclosure Bulletin, Vol. 33, No. 5 (October 1990) entitled "Regenerative Clock Technique For Servo Track Writers" suggests servo writing of a head/disk assembly after the covers are in place by means of the product head and without the use of an external position encoder disk. A single clock track is written at the outer diameter and divided into alternate A and B phases. The head is than stepped inwards half a track at a time using each phase alternately as a source of clock information from which servo information in the servo sectors preceding each data field and further clock signals in the alternate phase can be written. The half track steps ensure that the previously written clock information can be read. The technique dispenses with a dedicated servo writer clock head and associated mechanisms. International Patent Application No. WO94/11864 teaches a hard disk drive comprising a rotating disk with a recording surface, a transducer in communication with the surface and servo-actuator means for radially sweeping the transducer over the surface, a variable gain read amplifier connected to the transducer, an analog to digital converter (ADC) attached to the variable gain amplifier, an erase frequency oscillator coupled to the transducer for DC erasing of the disk surface, a memory for storing digital outputs appearing at the ADC, and a controller for signaling the servo-actuator to move to such radial positions that result in transducer read amplitudes that are a percentage of previous read amplitudes represent in the digital memory. Bit-synchronism between tracks is maintained by writing an initial clock track with closure and then writing a next clock track including a regular sequence of clock bursts a half-track space offset such that the initial clock track can be read in between writing clock bursts and the read signal is used to frequency-lock an oscillator which is used as a reference for the writing of clock bursts of the next track. A checkerboard pattern of clock bursts is thus created. All subsequent tracks are built incrementally by stepping off a half of a track from the last track written, which comprises clock bursts, and writing a next new sequence of clock bursts that interlace with the previous track's clock bursts.

BACKGROUND ART SPECIFIC TO RADIAL SELF-PROPAGATION

The process of disk file servowriting using only the internal recording transducer and product actuator, referred to as self-servowriting, involves a combination of three largely distinct sub-processes, writing and reading magnetic transitions to provide precise timing, positioning the recording transducer at a sequence of radial locations using the variation in readback signal amplitude as a sensitive position transducer, and writing the actual product servopattern at the times and radial location defined by the other two processes. The present invention addresses significant shortcomings of the radial positioning process, referred to here as self-propagation, as previously described in the prior art, specifically U.S. Pat. No. 4,414,589 by Oliver, et al., International Patent Application WO94/11864 by Cribbs et al., as well as the above mentioned related U.S. patent application Ser. No. 08/028,044 by Chainer et al.. The concept of self-propagation as applied to disk file servowriting, while promising very substantial benefits with regard to servowriting cost (as pointed out in the 1983 U.S. Pat. No. 4,414,589 by Oliver, et al. for example), has not yet been commercially realized.

Briefly, the shortcomings in previously described techniques are associated with lesser accuracy in the placement of the servopatterns as compared with conventional servowriting. The requirements for ever closer track spacing in disk files makes highly accurate servopattern writing a necessity. The cost advantages of self-propagation are not sufficient to supplant conventional servowriting without addressing and solving the problem of servopattern inaccuracy. Two factors contribute to reduced servopattern accuracy when using self-propagation; error compounding and higher levels of random mechanical motion. In conventional servowriters the radial positioner is an external device that affords stable location of the recording transducer by virtue of its relatively high mass and stiff attachment to a large granite block that has minimal vibration. Random mechanical motion of the recording transducer is therefore kept very small, and the track shapes defined by the servopatterns are almost perfectly circular. Errors that do occur are totally uncorrelated from track to track, so compounding is never a consideration. Average track to track spacing is accurately maintained through the use of a laser displacement measurement device. In self-propagation, the radial position signal that is used to servo-control the actuator is derived from measurements of the readback amplitude of patterns that were written during a previous step. An error in one step of the process can affect the position of the recording transducer on the next step so it is essential that the compounding effects of a very large number of steps be considered.

A simple solution is to use only weak servo control so that radial placement errors are averaged out rather than dynamically tracked. This is the approach described in Chainer et al.. This is also implicit in the patent of Oliver et al., where the propagation pattern is physically overwritten at each step. This means that the readback amplitude cannot be determined at the time of writing, hence the servo controller must be essentially free running with no ability to dynamically adjust to the pattern. However, random mechanical motion may be kept small only by using a very tight servo control. Thus, elimination of error compounding comes at the expense of higher random mechanical motion, thus making this solution unattractive. Also, the use of a low bandwidth servo requires long times for stepping and settling to the proper location, leading to increased servowrite times and higher cost.

In Cribbs et al. there are suggestions that the servo control does dynamically track the written pattern edges, but there is no discussion of how this affects error compounding. In fact, they describe a refinement to reduce "hunting" and "dithering" of the actuator that most likely arises from just such a compounding effect. In further discussion below it will become apparent that this refinement merely hides the presence of excessive error compounding during the servowrite process, rather than actually eliminating it.

Servopattern errors of different types have varying degrees of importance with regard to ultimate disk file performance. The absolute radial position of each track on the disk needs to be controlled only moderately well since regular updates of track count are available, even during high speed seeking between tracks that are far apart. Similarly the average track spacing in absolute units is not especially tightly constrained. There is a maximum absolute spacing such that the desired number of data tracks be contained between the inner and outer mechanical stops of the actuator, but as long as the recording transducers of the disk file are narrow enough the spacing could be less than this maximum with no ill effects. Thus, it is not the absolute spacing that is critical, but rather the relative spacing as compared to the recording transducer. The techniques described in Chainer et al. for determining the widest head within a disk file and using measurements from that head to set the track spacing for all heads are generally effective for ensuring that the average track spacing meets the necessary criteria. However an unforeseen problem with regard to the determination of the ideal amplitude reduction factor to use for a servo control reference during self propagation has arisen with the introduction of recording transducers in which the read and write elements do not coincide. A need exists for a method to compensate for misalignment of these two elements such as arises from variations in normal manufacturing, as well as changes in their relative alignment with respect to disk tracks when a rotary form of actuator is used to position the recording transducer.

While it is desirable that the track shapes be reasonably close to circular in shape, the disk file servoactuator will repeatably follow moderate amounts of deviation so that data tracks will be read back on the same trajectory as they were written. Thus, as long as adjacent tracks are distorted similarly, absolute circularity need only be maintained within fairly coarse bounds, determined by a desire to limit the repeatable motion of the actuator to roughly one head width or so, as opposed to readback mis-registration concerns which require a limit of a small fraction of the head width. The most important consideration for servopattern accuracy is local track to track spacing, referred to as track squeeze, since a prime requirement in disk files is that adjacent tracks be everywhere separated by some minimum spacing. This ensures that adjacent track information will not be detected on readback (this causes data read errors) and, even more importantly, that adjacent track data will never be overlapped excessively during writing since this could result in permanent loss of user data. Track squeeze is determined by the radial separation between adjacent track locations as defined by the product servopattern as written on each track and at each angular location around the disk. In other words, the detailed shape of each track relative to its neighbors must be considered, not just the track to track distance averaged around the whole disk. This is because the servo-control of the actuator during actual file operation is capable of following distortions from perfect circularity and will produce misshapen data tracks. The data tracks do not exactly match the servopattern track shapes because the servo loop follows accurately only up to a limited frequency, but it is a reasonably good approximation to simply take them as being identical. The general arguments that follow are unaffected by this level of detail, but one would wish to include this effect when determining a precise product specification for track squeeze.

In setting the minimum allowable spacing, one must take into account the existence of random fluctuations about the desired track location (as defined by the servopattern) that result from mechanical disturbances during actual file operation. One of the largest sources of disturbance is the turbulent wind blowing against the actuator from the spinning disks. These fluctuations, referred to as TMR (for track mis-registration), define a relevant scale for judging the required accuracy of servopattern placement. If servopattern errors are roughly equal to or greater than the TMR then a substantial fraction of the spacing margin will be required as compensation, leading to a reduction in total disk file data capacity. Once the servopattern placement errors are less than about half the TMR, however, further reduction does not provide much improvement in total data capacity. The random mechanical motion that results when a very low bandwidth servo is used, is observed to be roughly 5 times greater than the TMR experienced during file operation. Clearly, the use of such a servo loop during self propagation would result in unacceptably large errors.

Self-propagation patterns consist of bursts of transitions located at intervals around the disk surface. The edges of the bursts comprise a set of points that define a track shape that the servo controller will attempt to follow on the next step of the process. Thus, errors in the transducer position during the writing of the bursts appear as distortions away from a desired circular track shape when the actuator is subsequently moved outward to servo off the edges of the bursts. Sensing this non-circular trajectory during the next burst writing step, the servo controller moves the actuator in an attempt to follow it. This causes the new bursts to be written at locations that reflect (via the closed-loop response of the servo loop) the errors that were present on the preceding step together with additional errors arising during the present step. Each additional step in the process therefore carries forth a "memory" of all preceding track shape errors. This "memory" depends on the detailed closed-loop response of the the servo loop. Effects that result in track shape errors include random mechanical motion as well as modulation in the width of the written track that may come from variations in the properties of the recording medium or in the flying height of the transducer. These modulation effects are typically small compared to the total data track width but are often very repeatable from track to track and can grow to very substantial levels if compounded repeatedly. Uncontrolled growth of such errors can lead to excessive amounts of absolute track non-circularity. In some cases error compounding can lead to exponential growth of errors. All error margins will then be exceeded, and the self-propagation process itself will likely fail.

In Cribbs et al. written track width modulation arising from flying height variations is described as a source of track shape error that impacts the self-propagation process. A procedure is outlined in which three extra revolutions of the disk are used to smooth the servo error control signals so as to reduce "hunting" and "dithering" of the servo actuator before each step of writing propagation bursts. It is unlikely that track width modulation large enough to detect as excessive "hunting" could occur within any one step of burst writing, especially since width modulation is a secondary effect as compared to on-track readback modulation, and a preliminary step in their process is to reject all disk files having excessive on-track modulation. It is more likely that, in accordance with our experiences and detailed analysis, intrinsic width modulation typically appears at the level of only a few percent of the track width, but grows through error compounding to much larger levels. It is also clear that a signal that is discernible in the position error signal of a high gain servo loop is indicative of an underlying track shape error that is far greater than the error signal itself. This follows from the fact that the position error signal is merely the residual part of the underlying track shape error that the servo loop was unable to follow. The procedure of adjusting the target amplitudes while track following so as to smooth the position error signal is one in which the underlying track shape error is merely hidden, not eliminated. Below, we show that the detailed response of the servo loop is critical to understanding the problem of error compounding. Adjustments of the target amplitudes as described by Cribbs et al. may work to limit error growth with some types of servo loops, but since no specification of servo response is given, the issue is left to chance. Even if the smoothing were to work, the solution is unattractive in that three extra revolutions of the disk are required at each step in the process. This doubles the servowrite time, and raises the cost.

As mentioned above, self-propagation suffers from higher levels of random mechanical motion than conventional servowriters having massive external positioning devices. Random mechanical motion can be lowered through the use of a high gain servo loop, but this affects error compounding. Basically, a compromise must be made in which the random mechanical motion during servowriting can be brought down to a level about equal to or even slightly higher than the operating TMR of the disk file. As described above, servopattern errors of this magnitude are large enough to require substantial extra space between data tracks, hence they result in lower disk file capacity. None of the prior art teaches about the problem of random mechanical motion resulting in reduced disk file capacity, or the relationship between random mechanical motion and error compounding, or even about error compounding by itself.

SUMMARY OF THE INVENTION

It is a principal object of the present invention to provide a method by which self-propagated servopattern track shape errors can be kept from growing during the self-servowriting process.

It is another object of the present invention to provide a method by which the unavoidable random errors due to mechanical motion of the recording transducer during the servowrite process can be effectively cancelled in their effects upon the final product servopattern, thereby resulting in higher accuracy track shape definition than any other method of servowriting.

Another object of the present invention to provide a method to compensate for misalignment of the read and write elements of a dual-element recording transducer so that a desired track spacing may be established and maintained through the self-propagation process.

A further object of the present invention is to keep the servowriting time as short as possible thereby lowering cost.

A preferred embodiment of the present invention comprises a disk drive with its associated electronics for writing and reading magnetic transitions and its actuator for positioning the head at any radial position together with timing circuitry for controlling the reading and writing in specific sectors on the disk, a pattern generator for producing write data for propagation bursts and product servopatterns, a time delay unit for making fine adjustments in relative timing of the write data, amplitude detection circuitry for measuring the readback amplitude of written transitions, a memory for storing various quantities such as the measured values of the readback amplitudes and reference track values, a divider for normalizing instantaneous readback amplitudes by their corresponding original full-track amplitudes, a microprocessor sequence controller and a servo controller having variable control parameters to allow rapid stepping and settling followed by a special form of control during the write process that limits the growth of track shape errors while substantially rejecting mechanical disturbances. The disk file servopattern demodulation circuitry comprises part of this embodiment in that it is made compatible with the random error cancellation technique applied to the written servopattern.

In contrast to earlier proposed techniques, the present invention uses a relatively high servo bandwidth (with response at frequencies substantially higher than the rotation frequency) during the stepping, settling, and writing of the radial positioning bursts. This provides advantages in that TMR is reduced during writing, and the settle out process is more rapid.

A problem with using a higher bandwidth servo loop that is avoided in the present invention is that track shape errors that occur during the writing of one set of bursts are followed during the writing of the next set of bursts thereby causing the errors to add up from step to step. A particularly bad form of track shape error arises from systematic modulation in the width of the track around the disk. This can arise from variations in fly-height or recording medium properties and can be very repeatable over large numbers of tracks. An ideal servo loop will closely follow the burst edges and the track shape errors will grow linearly with the number of steps propagated. Thus, even a tiny amount of width modulation will grow to unmanageable levels. The track to track variation in shape remains low but the overall track non-circularity eventually becomes excessive. For real servo loops such as typical disk file track following servo loops, the response to changes in position signals (given by the closed loop response) exceeds unity throughout a range of frequencies (and involves phase shifts as well). Errors in track shape corresponding to frequencies at which the magnitude of the closed loop response exceeds unity will be amplified on subsequent tracks leading to exponential growth of track shape errors. This exponential growth occurs for both systematic (such as write width modulation) and random errors (as from TMR). The solution to this problem provided by the present invention involves using servo loop parameters that make the magnitude of the closed loop response less than unity at frequencies equal to integer multiples of the rotation frequency. Constraining the servo loop transfer function in this way limits the growth of errors (both systematic and random) to finite levels. Aside from this constraint the closed loop response may be adjusted to provide substantial reduction in TMR and fairly rapid step and settle performance. Multiples of the rotation frequency are of primary concern because once an error is recorded as a track shape on the disk it appears on readback as a repeatable waveform having nonzero Fourier components only at integer multiples of the repeat frequency.

Another aspect of this invention involves using the position error signal during the write process to dynamically correct for position errors as they are being written in the ultimate product servopattern. This requires that the written servopattern have the property that it can be modulated in a controllable way. The technique involves applying timing shifts to either an amplitude burst or phase encoded servopatterns to accomplish this cancellation of written-in radial position errors.

Thus in accordance with the invention a method for servowriting a rotating disk in a disk drive including a head for interacting with said disk, an actuator for positioning the head radially with respect to said disk, means for causing said head to write on and read information from said disk, and a servo loop for positioning said actuator in accordance with servo position information read from said disk, comprises the steps of writing a series of first patterns along a track; displacing the head a known fraction of a track to a displaced position; reading from selected ones of said first patterns, position information for determining deviation information representative of deviation of said head from said known fraction, and using said deviation information to propagate second patterns at said displaced position with said deviation information encoded in said second patterns.

The invention is also directed to a method for propagating a pattern in a disk drive having a rotating disk, a head for interacting with said disk and means for positioning said head radially with respect to said disk comprises the steps of:

a. writing first patterns on a first track;

b. reading and storing amplitudes of selected ones of said first patterns to thereby store selected amplitudes;

c. moving said head a fraction of a track width and writing second patterns corresponding to said selected first patterns;

d. repeating step c, n times for successive moves of said head until said head reaches a selected radial position and writes additional patterns;

e. positioning said head at an intermediate position between said first track and said selected radial position;

f. computing a first ratio of amplitudes of said first patterns with said head at said intermediate position to said selected stored amplitudes;

g. computing a second ratio of amplitudes of said additional patterns when said head is at said intermediate position to amplitudes with said head at said selected position;

h. repetitively repositioning said head and repeating steps f and g at each position until said ratios are substantially equal;

i. comparing said ratio to a desired value to determine a deviation from said desired value; and j. adjusting spacing between the writing of successive patterns so that said deviation is minimized on subsequent repetitions of steps a–i. This method is particularly useful when the head has separate read and write elements.

A similar correction must be applied to the amplitude burst propagation pattern in order to prevent the propagation servo loop from attempting to follow the track shape error on the next step (which would then result in an image of it being transferred to the product servopattern, i.e. it would merely appear one step later). The correction can be applied to the amplitude burst propagation pattern simply by modifying the reference amplitude values used by the servo loop (referred to as target values by Cribbs et al.) before stepping to reflect the position error signal as detected during the write. By pre-compensating the reference amplitudes to account for the known position error during the write, the servo loop will register no error as it follows a smooth trajectory. This bears a superficial resemblance to the servo error smoothing refinement described by Cribbs et al. but differs in both form and function in ways that shall be made apparent in the following discussion. The advantage provided by this error cancellation is that patterns servowritten in this way will have greatly reduced random shape errors from track to track.

DESCRIPTION OF THE DRAWINGS

FIG. 3 is a flow diagram illustrating the basic process steps for one embodiment of the present invention.

FIG. 4B is an illustration of a servo loop showing how the signals from bursts as shown in FIG. 4A are combined to form a position error signal.

FIG. 5 is a flow diagram illustrating the basic process steps for an alternative embodiment of the present invention with many of the process steps being the same as in FIG. 3.

FIG. 9 is a diagram showing the locations of the various propagation bursts in relation to user data tracks and showing a read element positioned such that it yields equal readback amplitudes for an A and a D propagation burst.

FIG. 11A is a diagram illustrating the relative locations of A and B bursts in a two-burst amplitude servopattern together with the sector ID field and showing the read element centered on the data track location.

FIGS. 11B to 11F illustrate the various signal waveforms associated with the gated integrator type of product servo-pattern demodulator.

FIG. 13A illustrates the same features as FIG. 11A for a two-burst amplitude servopattern but with the A burst displaced radially as occurs for written-in TMR errors.

FIGS. 13B to 13F illustrate the same signal waveforms as in FIGS. 11B to 11F but for the erroneous servopattern burst location of FIG. 13A.

DETAILED DESCRIPTION OF THE PREFERRED EMBODIMENTS

Figure 1:
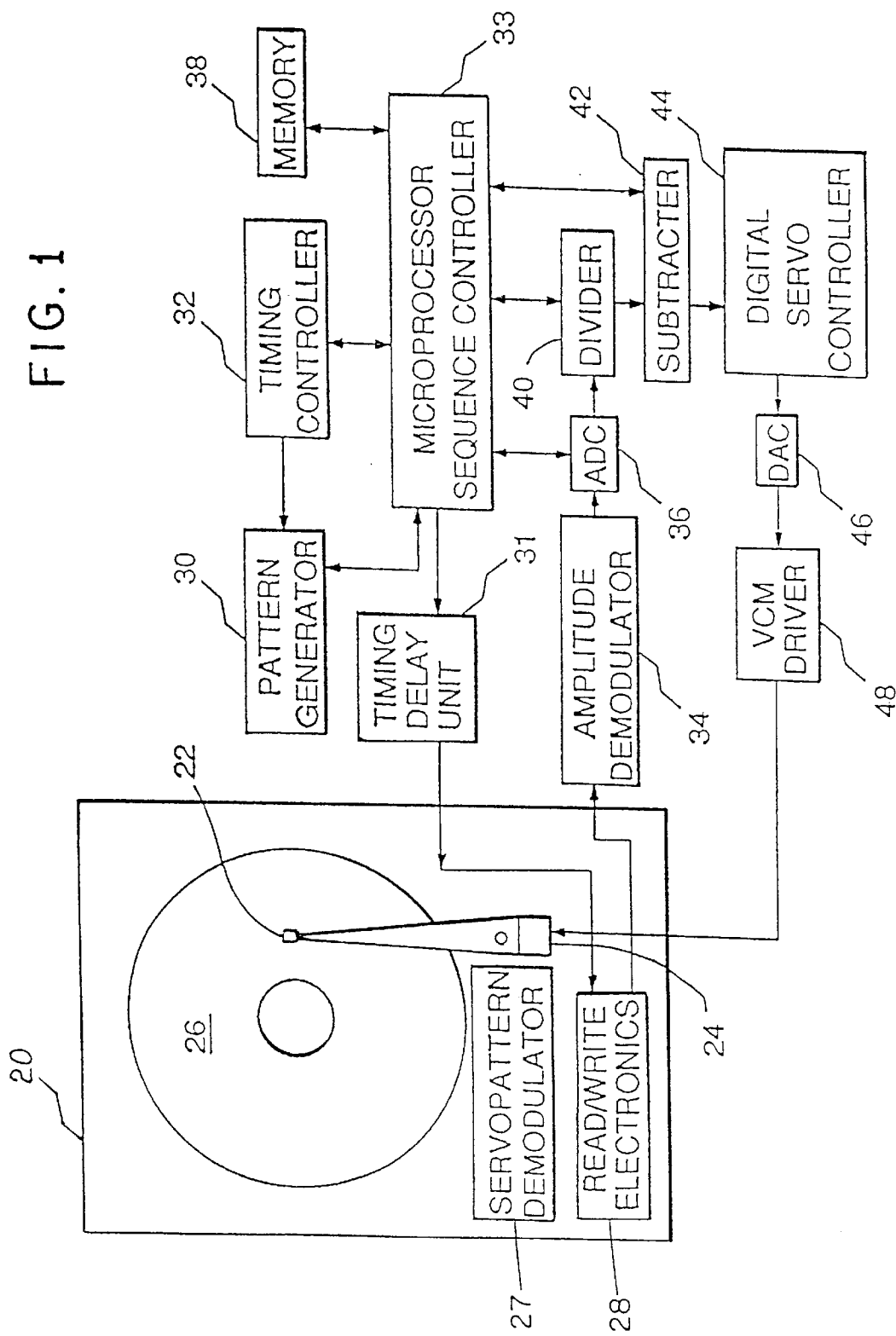
FIG. 1 is a block diagram showing the major elements of an embodiment of the present invention.

FIG. 1 shows the major components of a preferred embodiment of the present invention. A disk drive 20 with its recording transducer 22, voice coil actuator 24, recording medium 26, servopattern demodulator 27, and read/write control electronics 28, is connected to a time delay unit 31 in series with a pattern generator 30, which is clocked by a timing controller 32 that allows bursts of magnetic transitions to be recorded at precisely controlled times. For the purposes of radial self-propagation burst writing and detection, the timing controller can be a unit such as the Am9513A system timing controller manufactured by Advanced Micro Devices Corporation of Sunnyvale, Calif. that is simply synchronized to a once per revolution index timing mark, but it is understood that the writing of actual product servopatterns requires much tighter timing control, particularly when writing the servo identification fields and whenever writing phase encoded servo patterns. Methods for achieving such precise timing control using the internal disk file recording transducer, in a manner consistent with self-propagation are described in the related U.S. patent application Ser. No. 08/028,044.

A readback signal from a file read/write electronics circuit 28 is connected to an amplitude demodulator circuit 34 the output of which is converted to digital form by an analog to digital converter (ADC) 36 at times determined by timing controller 32 acting in concert with a microprocessor sequence controller 33. Sequence controller 33 also accesses a memory 38 for storage and retrieval of digitized readback amplitudes used by a divider 40. Sequence controller 33 with memory 38 also provide for the storage and retrieval of reference table values used by a subtracter 42 in creating the position error signal (PES) that serves as the input to a digital servo controller 44. Sequence controller 33 also provides computation capabilities for general use in determining modifications to the stored reference table values and for determining appropriate delay settings to be applied to timing delay unit 31, and producing control signals for pattern generator 30. The output of digital servo controller 44 is converted to analog form by a digital to analog converter (DAC) 46, and is further amplified and converted to a current by a VCM driver 48. The driver current is applied to voice coil actuator 24 in the disk file causing recording transducer 22 to move approximately radially with respect to recording medium 26. In one embodiment, the functions of divider 40, subtracter 42, and digital servo controller 44 are all achieved through the appropriate programming of microprocessor sequence controller 33.

Figure 2:
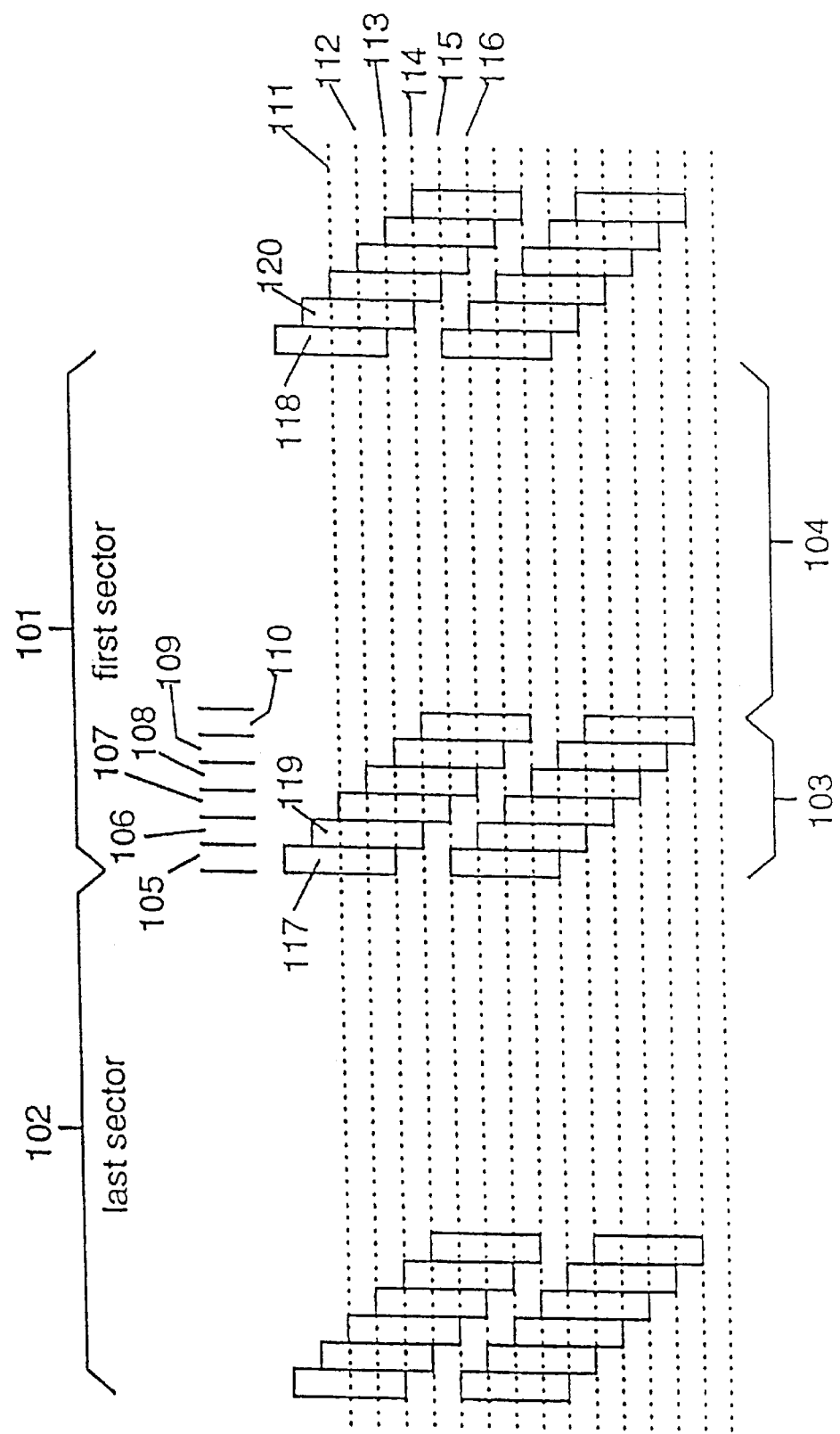
FIG. 2 is a diagram illustrating the relationship between the propagation tracks, disk sectors and propagation bursts.

FIG. 2 shows a diagram of a portion of recording medium 26 illustrating the division into a number of propagation tracks 111, 112, 113, etc. as well as a division of each track into a number of sectors, with a first sector 101 typically coming immediately after the disk rotation index as determined either by an index pulse from the disk spindle motor driver or from the timing controller. Each sector is further divided into a region 103 containing the amplitude bursts for propagation and a region 104, which is reserved for the use of the precision timing propagation system and for writing the actual product servopattern including sector ID fields and either amplitude burst or phase encoded patterns. In one embodiment of this system propagation burst areas 103 will be overwritten with user data following servowriting. All of region 104 except for the part containing the product servopattern will also be overwritten with user data. Each propagation burst region is further divided into a number of slots 105–110 within which the amplitude burst patterns (A,B,C,D,E, and F) for propagation are written. In this figure, the propagation track pitch is shown as one quarter of the assigned data track width. For example, if the first user data track is chosen to be centered on propagation track 112, the next data track would be centered on propagation track 116, and so on across the disk. Other ratios of propagation to data track pitch can be used, but the 4:1 ratio shown allows fine adjustment of the timing of grey code bits and phase encoded product servopatterns. Typically, the data track pitch is chosen to be slightly larger than the transducer write width so the edges of adjacent data tracks do not overlap. This can be seen in FIG. 2 by noting the relative radial locations of B and F bursts since these correspond to the above mentioned choices of data tracks centered on propagation tracks 112 and 116 respectively.

The propagation burst pattern shown consists of a repeating sequence of 6 bursts. This is useful because the bursts in each slot do not overlap along the radial direction thereby allowing the recording transducer to back up and read previously written bursts. Such a process can be used to check the spacing of the propagation tracks relative to the recording transducer width without having to propagate completely across a disk surface. This is described in more detail later. The minimum number of slots required for propagation without such checking is 2.

A typical number of sectors is 120 and a typical disk rotation rate is 5400 rpm, giving about 92 microseconds per sector. A typical slot time is 7 microseconds. This is longer than the typical amplitude burst duration used in a product servopattern (1 microsecond) but there is no loss of user data space with expanded propagation bursts since they will be overwritten later. An advantage of longer bursts is that they allow more filtering time to be used during demodulation resulting in a higher signal to noise ratio which simplifies some of the digital servo loop computation, particularly with regard to determining derivative or velocity related servo terms. Shorter burst times could be used if more time is needed for timing marks and product servopattern writing in regions 104.

Referring to the flow diagram of FIG. 3, the iterative self-propagation process starts with step 130 in which the recording transducer is located at either the outermost accessible track (OD) or innermost accessible track (ID) of the disk file with the actuator being pushed against a physical stop to lock it against mechanical disturbances. In step 132, first propagation track 111 (FIG. 2) is written with A bursts in the first slot of each propagation burst region. Also, the first portion of the product servopattern is written within region 104 of each sector together with the precision timing marks. These may, for example, occupy only a small portion at the beginning of region 104 on the same surface as the propagation burst patterns and be written during the same revolution of the disk. Furthermore, other recording surfaces within a stack of disks may be written with their product servopattern in time succession throughout region 104 by switching the write electronics to select each recording transducer in turn (it is usual for each recording surface to have its own recording transducer, all of which move together on a single actuator). This first revolution in the process is referred to as a write revolution.

On the next revolution of the disk, referred to as a normalization revolution and shown as step 134 in FIG. 3, sequence controller 33 signals ADC 36 to sample and digitize the demodulated readback amplitude during the first slot of each sector and records these values in an A burst normalization table in memory 38.

After all sectors have been read in the normalization revolution but before the first propagation burst region 103 of the next revolution the parameters used in the servo control voltage calculation are set equal to predetermined values referred to as step parameters that provide rapid motion and settling, that is the gain and bandwidth are high. This is shown as step 136 in FIG. 3. As an example, servo parameters similar to those used in the operation of the disk file would work well as step parameters.

On the next revolution of the disk, referred to as a step revolution and shown as step 138, sequence controller 33 steps through the stored normalization table sector by sector, routing each value to divider 40. A reference track table in the memory has been pre-recorded with initial reference levels corresponding to desired amplitude reduction factors for each of the sectors. Typically, these initial reference levels are all equal. Similarly the reference track table values are routed to subtracter 42. ADC 36 continues digitizing the A bursts of each sector. As recording transducer 22 reaches the end of each propagation burst region 103, the output of subtracter 42 contains a number equal to the reference track table entry for that sector minus the amplitude of the preceding A burst divided by the stored normalization table value. This is the position error signal or PES. At this time, sequence controller 33 signals digital servo controller 44 to read the PES and compute a new control voltage setting. This control voltage is adjusted by the servo controller after each sector to drive actuator 24 in a direction that reduces the PES, i.e. toward propagation track 112.

Once actuator 24 has settled onto the desired location for propagation track 112 (typically in about 1 quarter of a disk revolution) the parameters of the servo control voltage calculation are changed to another set of special predetermined values referred to as propagation parameters that are tailored to provide rejection of mechanical disturbances without amplification of track shape errors. The manner in which these values are determined is described below. Even though the step to the next propagation track takes less than a full revolution, it simplifies matters to allow the revolution to complete before writing the next set of bursts. In one embodiment, this change in servo parameters is done gradually with the propagation parameters being reached only at the end of the step revolution. In FIG. 3 this process of setting the servo to have the propagation parameters is shown following step revolution 138, and is referred to as a step 140.

At this point only a single propagation track has been written so the result of a decision step 142 in which a count of propagation tracks is compared with a predetermined desired number that corresponds to the completion of the product servopattern is necessarily negative and the process returns to a write revolution 132. In this second write revolution 132, the sequence controller 33 signals pattern generator 30 to write bursts of transitions, B in the second slot of each sector. As before, precision timing marks and product servopatterns are also written in regions 104 on the same recording surface and just product servopatterns on the remaining recording surfaces. Throughout this write revolution, ADC 36 continues digitizing the A bursts and servo controller 44 maintains actuator 24 in a position such that transducer 22 stays close to the desired location of track 112. Each individual PES reading is used to adjust timing delay unit 31 in a manner that modulates the product servopattern as it is being written during the adjacent region 104 of the disk. Details of this modulation are described later. Additionally, the PES values during the write revolution are recorded in a table in memory 38 for use later in calculating new reference track values.

The next revolution is a normalization revolution, step 134, in which ADC 36 digitizes both the A & B burst amplitudes, storing the B burst amplitudes in a B burst normalization table, while the servo loop continues to track follow using PES values computed from the A burst amplitudes, the A burst normalization table values, and the stored reference track values. A new reference track table is also computed during this revolution. Each new reference track table value is set equal to a nominal average reference level determined previously to be appropriate for the desired average track spacing in this region of the disk plus a predetermined fraction of the previously recorded PES value for the corresponding sector obtained during the preceding write revolution. A convenient method involves replacing each reference track table value just after it is used for the computation of a control voltage. In this way, the servo reference track table during the normalization revolution is utilized with its previous values but ends up containing its new values in preparation for the upcoming step revolution.

Switching to the B bursts for PES computations, the process repeats, and transducer 22 steps to the next propagation track, step 138, followed by a write revolution, step 132, in which C bursts, timing marks and product servopatterns are written, followed by a normalization revolution, step 134, in which the C bursts are read back and stored in a normalization table. This continues (with A bursts following F bursts) until the desired number of data tracks is reached as determined by a yes answer to decision step 142 and the process stops in a step 144.

Figure 4A:
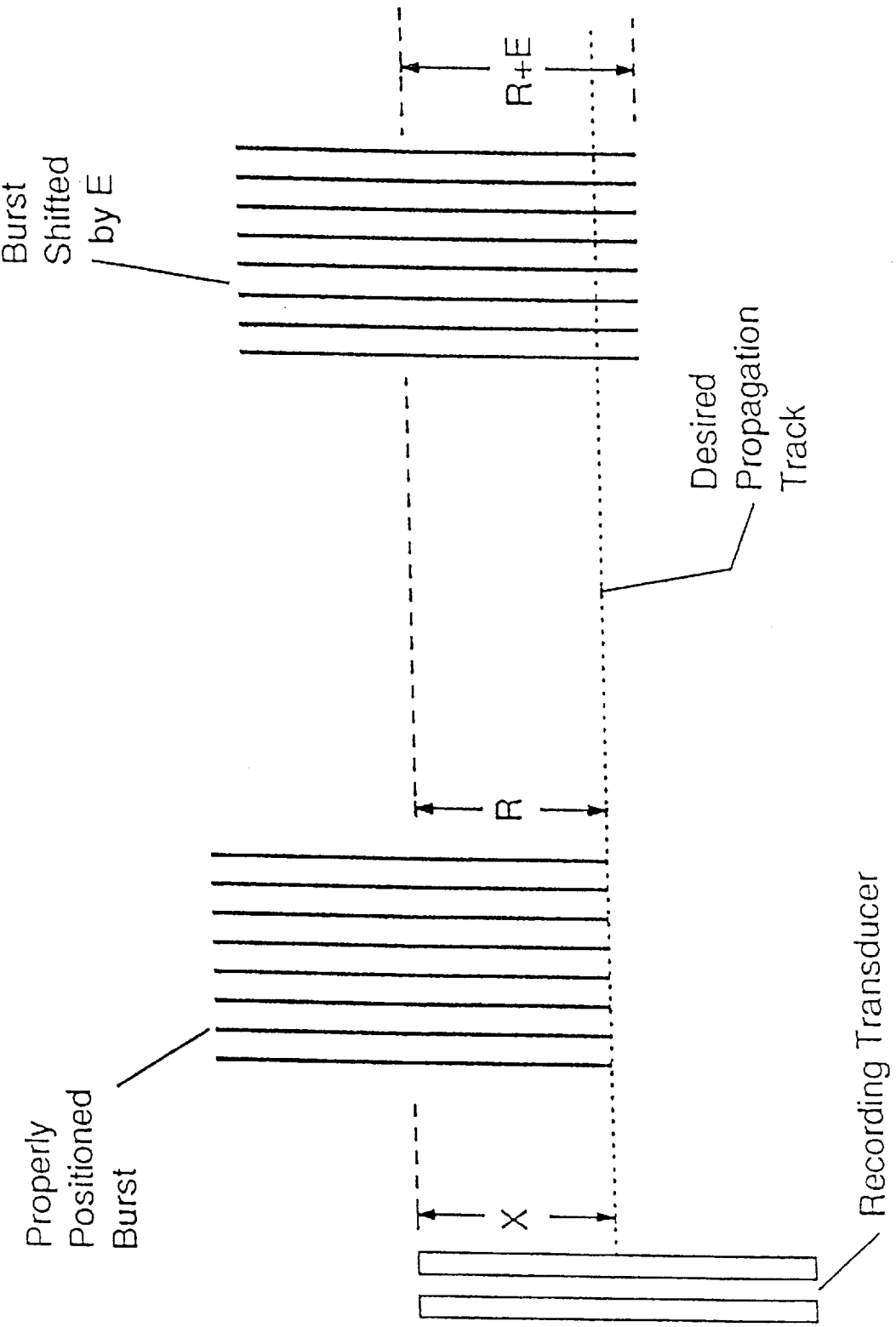
FIG. 4A shows the relationship of properly placed and mis-positioned propagation bursts with respect to a desired track.

In this system, disturbances that cause the actuator to deviate from the ideal propagation track (TMR) result in mis-positioned write bursts. Subsequent readback of such bursts at the next propagation track location results in a modulated position signal. FIG. 4A illustrates this process, showing a properly positioned burst and an mis-positioned burst relative to a desired propagation track. When centered on the desired propagation track a distance X from the preceding propagation track, the recording transducer reads back a relative amplitude R for the properly positioned burst. Since this is the desired location, this relative amplitude equals the reference track value, resulting in zero PES. The mis-positioned burst has its edge shifted from the desired propagation track location by an amount E relative to the width of the transducer resulting in a relative readback signal equal to R+E. Since E is determined by the location of the burst edge, changes in the width of written bursts is another source of error that produces effects similar to TMR.

FIG. 4B is a block diagram showing how the elements of the present invention may be combined to form the standard components of a servo loop as they are generally known in the art of servo-engineering, as described for example in the book "Modern Control Engineering" by K. Ogata published by Prentiss-Hall corporation of Englewood Cliffs, N.J., where terms are defined. The loop controller 150 is comprised of digital servo controller 44, DAC 46, and VCM driver 48. The "plant" 152 is defined as comprising actuator 24 and recording transducer 22. The plant output X represents the absolute position of the recording transducer in units of relative head width. In self-propagation, the only observable signal is the position of transducer 22 relative to recording medium 26 but it is useful to consider the absolute position X for the purposes of analysis of servo loop performance. A loop summing point 156 is explicitly included to account for the relative nature of the observed position signal. Thus the observed position signal equals the sum of the absolute position X and the burst position error E. This signal X+E is combined at a standard loop reference summing point 154 with the reference track value R to form the position error signal or PES. In usual fashion the sign shown next to the incoming arrows at a summing point represents a sign factor to apply to each signal before summing, hence the PES equals R−(X+E).

The net effect of the written burst location errors is to produce a non-circular trajectory that the servo loop attempts to follow, hence the errors act as an additional reference signal. The response to this trajectory is given by the closed loop response. Normally, it is desired that the closed loop response of a servo loop be exactly equal to unity (in which case the controller gain would approach infinity). Such a system produces an output that exactly follows the desired trajectory and is infinitely stiff against disturbances. In reality, only a finite controller gain can be used, and it must be frequency dependent to avoid loop instability arising from unavoidable phase shifts (positive feedback). In typical servo loop applications, including disk file actuator servos, the primary performance objective is to provide optimal rejection of mechanical disturbances within the constraints of a finite sampling rate, and the resulting closed loop response rises significantly above unity (1.5 or more) over a fairly broad range of frequencies. No drastic consequences arise from this. In the present situation, however, the response to a non-circular trajectory at a given propagation track is reproduced in the writing of the next propagation track, and that response is reproduced yet again on the next propagation track. The result is that an error at one propagation track appears N propagation tracks later multiplied by the closed loop response raised to the Nth power. Thus, if the magnitude of the closed loop response exceeds unity any error will grow indefinitely. If the closed loop response is less than unity, errors are compounded, but the effect of an error at any one step eventually decays. Thus the compounding is effectively limited to a finite number of steps n. Roughly speaking, n is given by 1 divided by the amount by which the closed loop response differs from unity. For example, a closed loop response of 0.99 yields n=100. Systematic errors such as written track width modulation will therefore grow by a factor of about n. The track to track error is still quite small, and only the less stringent limit on absolute track circularity need be a concern. Since written track width modulation is only a few percent effect, a substantial growth can be tolerated without exceeding the absolute circularity limit of roughly one track spacing.

With a typical disk file requiring many thousands of steps to servowrite, controlling the growth of errors is critical. An important feature of the present invention is the recognition of this phenomenon as being due to these special properties of servo loops as applied to a repetitive self-propagation process and the identification of a specific remedy in the adjustment of the servo loop parameters to ensure that the closed loop response does not exceed unity at any relevant frequency. The utility of this specification arises from the fact that very substantial rejection of mechanical disturbances can be achieved within this constraint, while not requiring extra processing time such as averaging signals over multiple extra revolutions of the disk. Even more importantly, this specification clearly delineates the operating regime under which stable self-propagation is guaranteed, thereby ensuring a robust servowriting process.

Viewed as a time waveform, the written burst location error trajectory is a perfectly repetitive function with a repeat frequency equal to the rotation frequency of the disk. A principle of Fourier analysis is that any such repetitive waveform has a frequency spectrum containing non-zero amplitudes only at the discrete set of frequencies corresponding to integer multiples of the repeat frequency, in this case the disk rotation frequency. Thus, the relevant frequencies at which the closed loop response must be kept below unity are all integral multiples of the disk rotation frequency.

FIG. 5 shows a flow diagram illustrating another embodiment in which, in accordance with the principles of the present invention, the writing of the product servopattern and optionally the timing marks may be changed to occur (luring the normalization revolution rather that the write revolution as described above illustrated in FIG. 3. Many of the process steps of FIG. 5 are the same as those of FIG. 3 and bear the same labels. This shift of the timing mark and product servopattern writing to a modified normalization revolution 134A decouples this operation from the writing of the propagation bursts during a modified write revolution 132A. Since the problem of error compounding requires special propagation parameters for the servo loop only during the writing of the propagation bursts, this decoupling makes it possible to use much higher gains during the writing of the product servopatterns and timing marks. In particular the parameters may result in a closed loop response substantially greater than unity over a range of frequencies including multiples of the disk rotation frequency. This is accomplished in a new process step 133 in which the servo parameters are set equal to special predetermined values that are tailored to provide low TMR. These parameters would be determined in a manner similar to that used in setting up the servo for actual disk file operation, i.e. the gain and bandwidth would be as high as possible consistent with avoiding loop instability due to frequency dependent phase shifts and a finite sampling rate as described above. A number of factors that would be recognized by those skilled in the art of electrical design and servo control systems may allow substantially lower TMR to be achieved during process step 134A than is possible in the actual file operation. These factors include for example, the improved signal to noise ratio achieved by using relatively long duration servo bursts, and the possibility of using more expensive electronic components such as ADC 36, DAC 46, and VCM driver 48 in a servowriter embodiment that is designed to be external to the product disk file. The reduced TMR during these operations results in lower random track to track errors and reduces the amount of random fluctuation in the amplitude of the readback signal from the timing marks as well. The latter effect will reduce the incidence of errors in the precision timing generation system of the self-servowriting system.

Also shown in FIG. 5 is an optional extra revolution step 135, that provides extra time for the writing of product servopatterns. This has a disadvantage of increasing servowrite time but may be necessary if a large number of disk surfaces are present within the disk file and the regions 104 dedicated to timing marks and product servopatterns are too short to allow product servopatterns to be written on all surfaces. As in the above discussion, it is advantageous to use higher servo gains during this extra revolution to take advantage of the lower TMR. The decoupling of the product servopattern and timing mark writing can also be accomplished by adding an extra revolution dedicated to just this process rather than combining it with the normalization procedure.

SERVO LOOP MEASUREMENTS

In a particular embodiment a PID (proportional, integral, derivative) type of servo loop was implemented using a personal computer together with a commercially available data acquisition plug-in board containing timing control circuitry, an ADC, and a DAC. Together with an amplitude demodulator, a VCM current driver, and a gated oscillator the system was hooked up to an IBM Spitfire disk drive and the 6 burst propagation sequence as described above (including the precision timing mark generation process together with a phase encoded servo pattern generator controlled by an additional computer) was carried out using various servo loop parameters. Such a system is suitable for use as an external servowriting system to be attached to the disk files through an electrical connector, but it is conceivable that the circuitry can be reduced to just a few integrated circuits to be included in every disk file for complete stand-alone self-servowriting.

In this servo loop, the control voltage equals the sum of 1) a proportional gain factor times the PES; 2) an integral gain factor times the sum of all previous PES readings; 3) a derivative gain factor times the difference between the present PES and the PES from the preceding sector. These three gain factors are the servo parameters that allow adjustment of the servo closed loop response (the ratio of the position signal response to a reference level modulation at a given frequency). The closed loop response at any frequency can be determined by applying a known reference level modulation at that frequency while measuring the position signal response at the same frequency. This can be accomplished without extra circuitry since the computer that functions as the digital servo controller has access to the real time position signal and has the capability of substituting sinusoidally modulated reference table values. By Fourier transforming a series of position signal readings obtained while applying a predetermined reference table modulation, the magnitude and phase of the response can be determined. This process can be carried out with a representative disk file using various combinations of servo parameters to find those that provide the required property of having the closed loop response less than unity at all multiples of the rotation frequency. For the PID controller, this property is met using relatively high derivative gain together with moderate integral gain and low proportional gain. Not all multiples of the rotation frequency actually need to be checked, only those lying near the peak of the response curve. Typically only frequencies up to about 5 times the rotation frequency are relevant. Also, relatively large changes in servo parameter values produce only moderate changes in the closed loop response, so a broad range of suitable parameters exist that provide both low TMR and a closed loop response less than unity. This makes finding good parameters fairly easy, and allows breathing room for variations from file to file in such parameters as head width that can effectively change the servo gains.

Figure 6A:
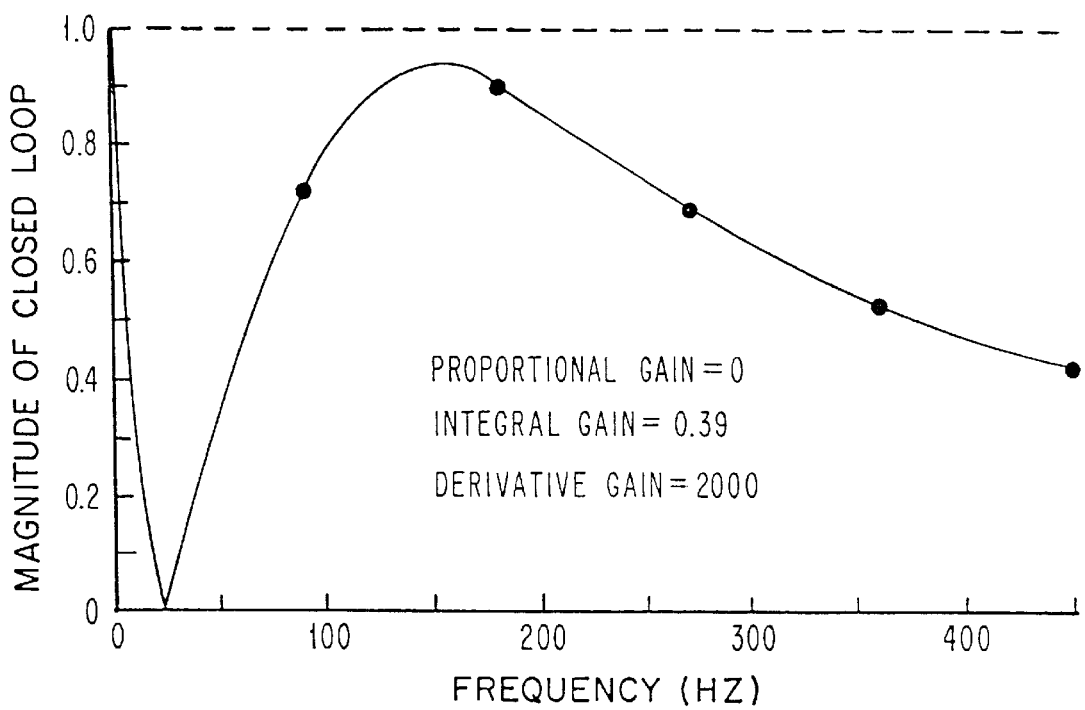
FIG. 6A is a plot of the magnitude of the closed loop servo response for a PID servo control loop having parameter values that result in the closed loop response being less than one at multiples of the disk rotation frequency of 90 Hz.
Figure 6B:
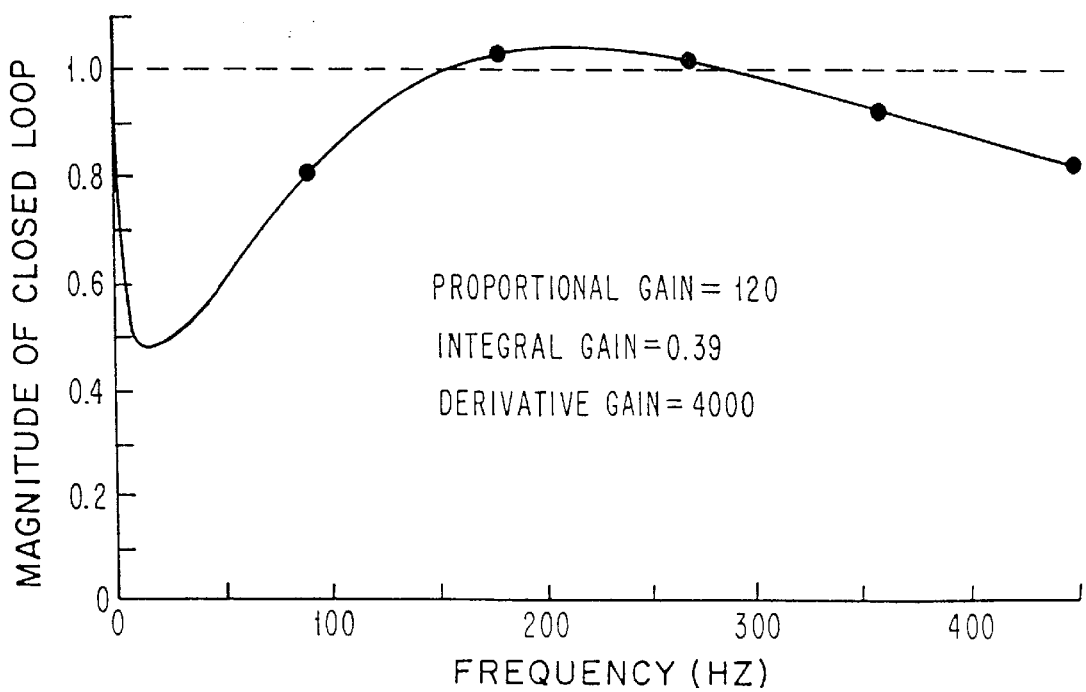
FIG. 6B is a plot of the magnitude of the closed loop servo response for a PID servo control loop having parameter values that result in the closed loop response being greater than one at twice and three times the disk rotation frequency of 90 Hz.

Alternatively, standard methods of servo loop analysis can be used to calculate the closed loop response from a knowledge of the controller gains along with a model of the actuator dynamics. For the test system the calculated results closely match the response data measured in the manner described above. The calculated transfer functions for two different sets of propagation parameters that were used in different tests of the system are shown in FIGS. 6A and 6B. The dots are included to highlight the first few multiples of the disk rotation frequency. In FIG. 6A the proportional and integral gain terms are very small, while the derivative term (which acts like viscous damping) is made large, but not large enough to cause the closed loop transfer function to exceed unity. This servo loop operates with only about 20% higher TMR than the actual product servo loop. With this system, radial propagation over 16000 steps is achieved without significant growth of track shape errors (less than about 50 microinches peak to peak), and with track to track shape differences of only about 5 microinches rms. With the parameters as shown in FIG. 6B the TMR drops to about 20% less than that with the product servo loop but the closed loop response is driven above unity at both twice and three times the rotation frequency, resulting in an inability to successfully propagate beyond about 70 steps due to growth of track shape errors.

Figure 7A:
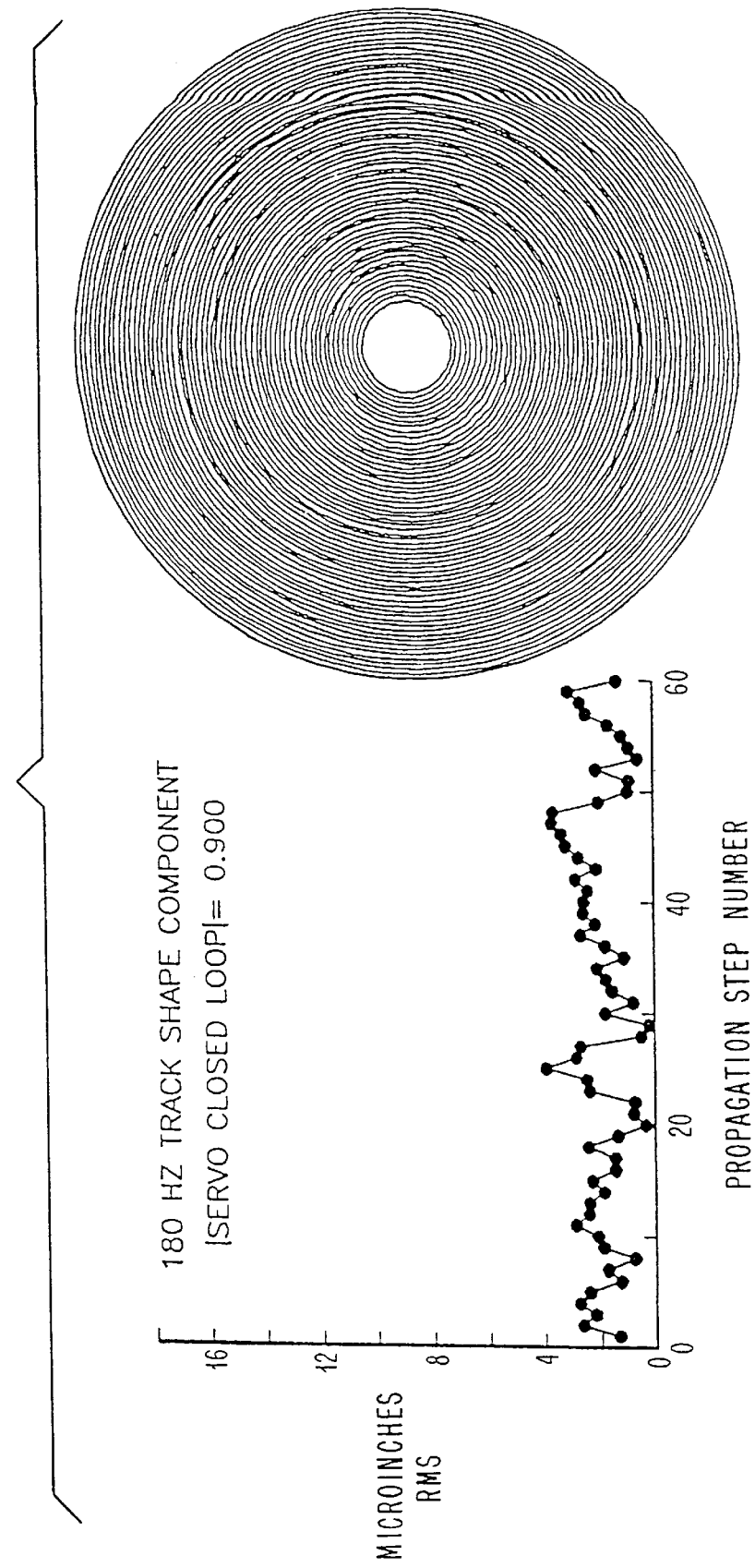
FIG. 7A is a plot of the 180 Hz Fourier component of the track non-circularity as measured for a self-propagation experiment using servo parameters as shown in FIG. 6A together with a diagram illustrating the actual track shapes in which the outermost track corresponds to propagation step 60.
Figure 7B:
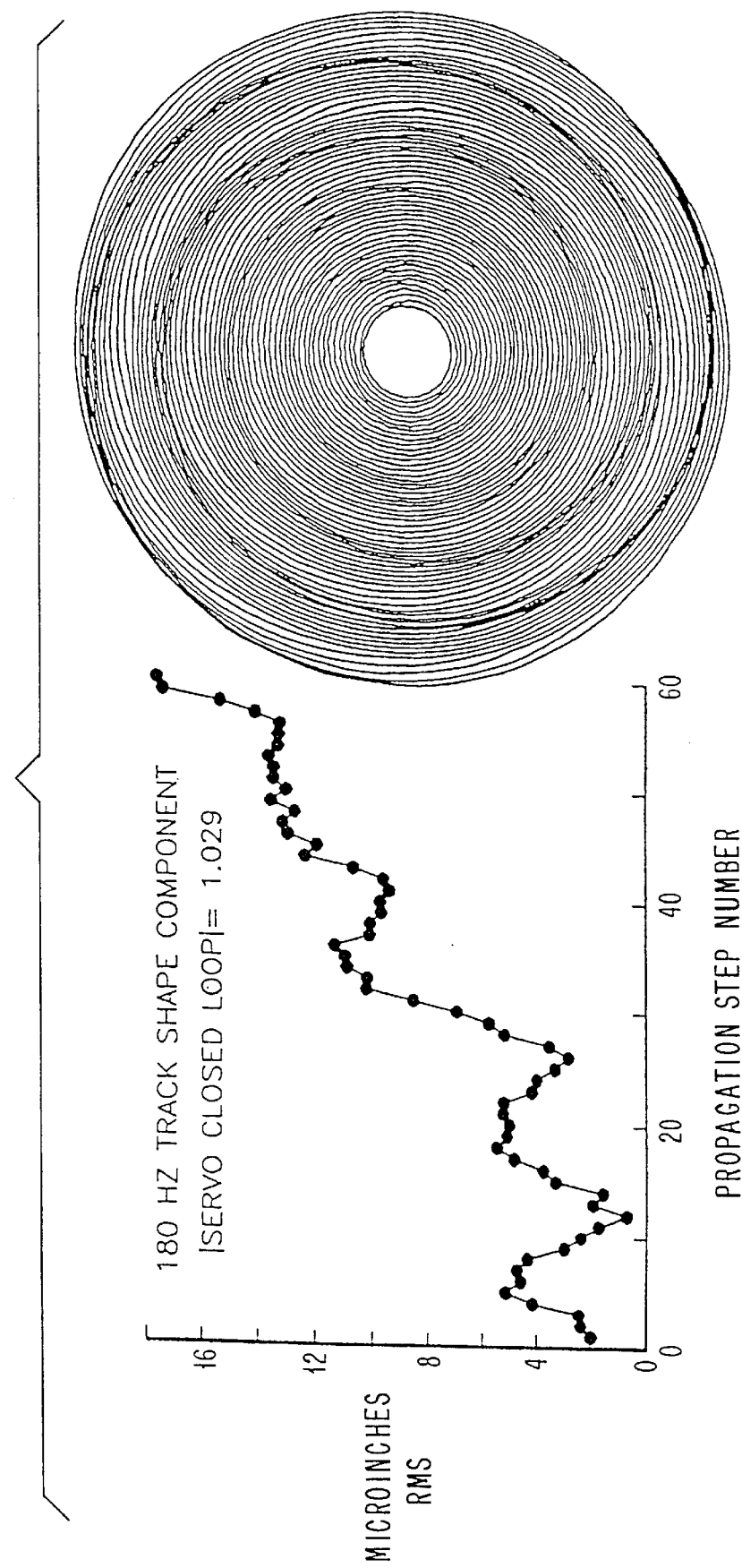
FIG. 7B is a plot of the 180 Hz Fourier component of the track non-circularity as measured for a self-propagation experiment using servo parameters as shown in FIG. 7B together with a diagram illustrating the actual track shapes in which the outermost track corresponds to propagation step 60.

This error growth is illustrated in FIG. 7B in which the circular diagram shows the measured track shapes for the first 60 propagation steps when using the propagation parameters of FIG. 6B. The track shapes were measured by backing up after the propagation sequence and holding the actuator at the average track location (using only a weak integral gain term in the servo loop) for each propagation track. The normalized readback amplitudes at each of the 120 sectors were then averaged for 100 revolutions of the disk to eliminate TMR effects. The resulting waveforms were plotted as radial deviations of circular tracks. The scale is enhanced by a factor of ten to show the track shape errors more clearly, i.e. the radial deviation is plotted 10 times larger than the corresponding track to track separation. Also, the circles are also spread over a much greater apparent radial extent than on the actual disk, where 60 steps represents only about 0.4% of the disk radius. A similar diagram in FIG. 7A shows the first 60 propagation tracks using the propagation parameters of FIG. 6A. Here the track shape errors are basically random and show no growth.

The data plots in FIG. 7A and FIG. 7B show the magnitude of the 180 Hz frequency component (2× the disk rotation frequency) obtained by taking the Fourier transform of the waveforms consisting of the 120 sectors of readback signals around each track. In FIG. 7B, where the closed loop response has a magnitude of 1.029 at 180 Hz, this component grows rapidly, rising from about 3 microinches to about 16 microinches in only 60 steps. For the parameters of FIG. 7A no growth is expected, and none is observed.

PHYSICALLY SEPARATE READ AND WRITE ELEMENTS

Figure 8A:
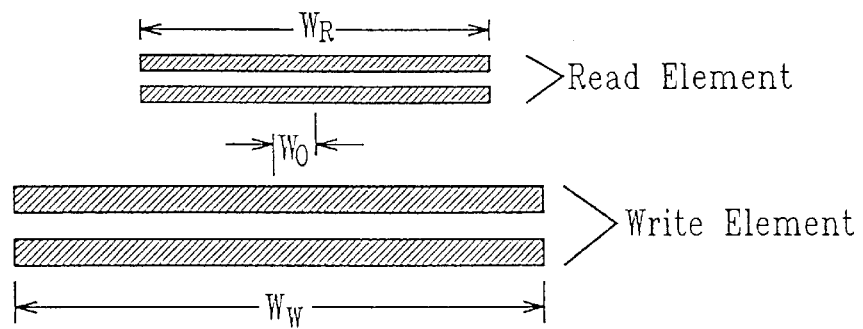
FIG. 8A is an enlarged, schematic diagram of a recording transducer in which the read and write elements are at separate positions.
Figure 8B:
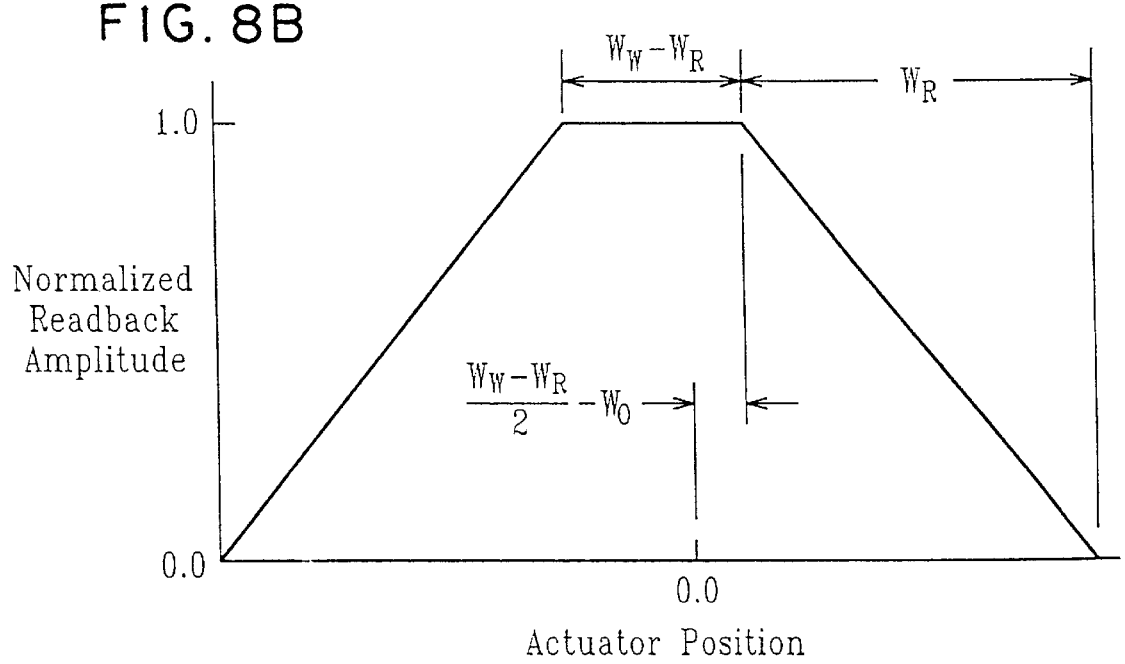
FIG. 8B is an idealized plot of the normalized readback amplitude versus off-track position that would be obtained for a recording transducer such as that shown in FIG. 8A.

In the discussion so far, it has been assumed that the recording read transducer and write transducer are one and the same, as in the typical inductive read/write element commonly used. Recently, transducers employing separate read and write elements such as the so called MR (magnetoresistive) transducers have come into use, and require special attention with regard to the determination and control of propagation track spacing by means of nominal average reference value settings. FIG. 8A is a diagram of such a transducer showing the different widths of the read and write elements along with an offset between read and write element centers. FIG. 8B shows a plot of how the normalized readback amplitude varies with the position of the actuator. Here, zero corresponds to the actuator position during the write. The actuator movement required to reach a particular level of amplitude reduction depends on the read width, write width, and offset (and which direction of motion is desired). It is desirable that the propagation track spacing be determined only by the read and write widths and not be affected by the offset in the elements. This is particularly important since the apparent offset changes as the rotary actuator sweeps from the outermost to the innermost track in a disk file (the spatial separation of the read and write elements along the actuator arm direction leads to different projected locations of these elements onto the disk track as the arm rotates). An important aspect of the present invention is the incorporation of a method for eliminating this dependence on read to write element offset in a manner that requires no prior knowledge of the precise geometry of the head and which can be achieved solely through measurements of readback amplitudes.

FIG. 9 is a diagram of the 6 burst propagation pattern showing the relative locations of the written bursts in one of the propagation burst regions. It is important for disk file data track spacing that, on average, the edges of adjacent tracks should have a specific amount of space between them to avoid overwriting of data on one track by a head that is supposed to be on the adjacent track. For example it may be desired that the data tracks be 4 propagation tracks apart and have an average space between written track edges of 25 percent of the data track pitch. This is the situation illustrated in FIG. 9, where user data tracks are shown assigned to locations corresponding to propagation bursts A and E. In this case, propagation bursts that are 3 steps apart, such as A and D have their edges just lined up. If the read element is positioned so that the relative amplitude from burst A equals the relative amplitude from burst D (the A=D position) then the relative signal is 0.50 if the edges line up, greater than 0.5 if the edges overlap, and less than 0.5 if the edges have space between. Thus, the relative amplitude at the A=D position is an indicator of whether the propagation track pitch is too small or too large and can be used to adjust the nominal average reference level used during propagation to correct the pitch.

If the readback amplitude varies linearly with position (a fairly good approximation) the adjustment in the nominal average reference level for propagation that is required to obtain the correct spacing can be computed from the measured relative amplitude at the A=D position. This can be seen by noting that a change in reference level by an amount r results in a change in the relative amplitude at the A=D position of 3r/2 because each of the 3 steps contributes a spacing change equal to r, and the change is shared equally by A and D. The nominal average reference level should therefore be adjusted by an amount equal to ⅔ of the deviation of the relative amplitude at the A=D position from its desired level.

The method of the present invention consists of the following steps. First, choose an initial nominal average reference value and propagate several steps (3 or more in this case). Next, back up to a location such that the relative amplitude of an A burst and D burst are equal. This is accomplished by temporarily re-defining the PES to be the difference between the relative amplitudes of the A and D bursts. Using the relative amplitude of A ( or D since they are now equal), compute the correction to the propagation nominal average reference level as described above and continue propagating.

Figure 10A:
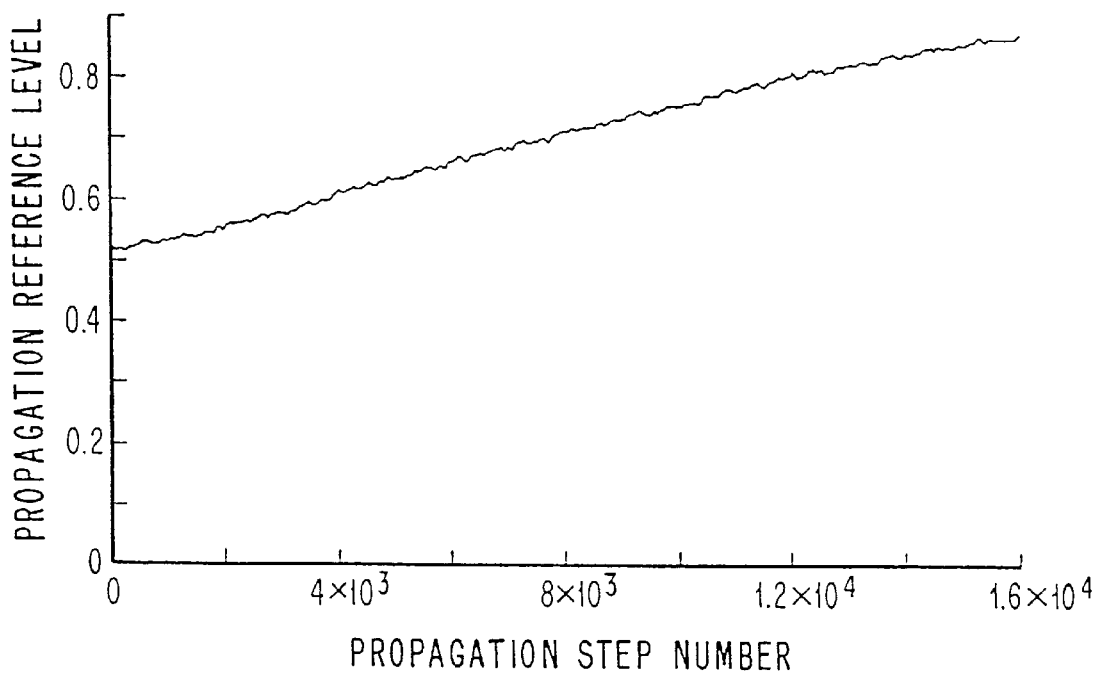
FIG. 10A is a plot of the nominal average reference value versus propagation step number obtained for a self-propagation experiment using a recording transducer having separate read and write elements as shown in FIG. 8A in which adjustments to the nominal average reference value were made by periodically backing up and measuring the average relative burst amplitude at the A=D servo position.
Figure 10B:
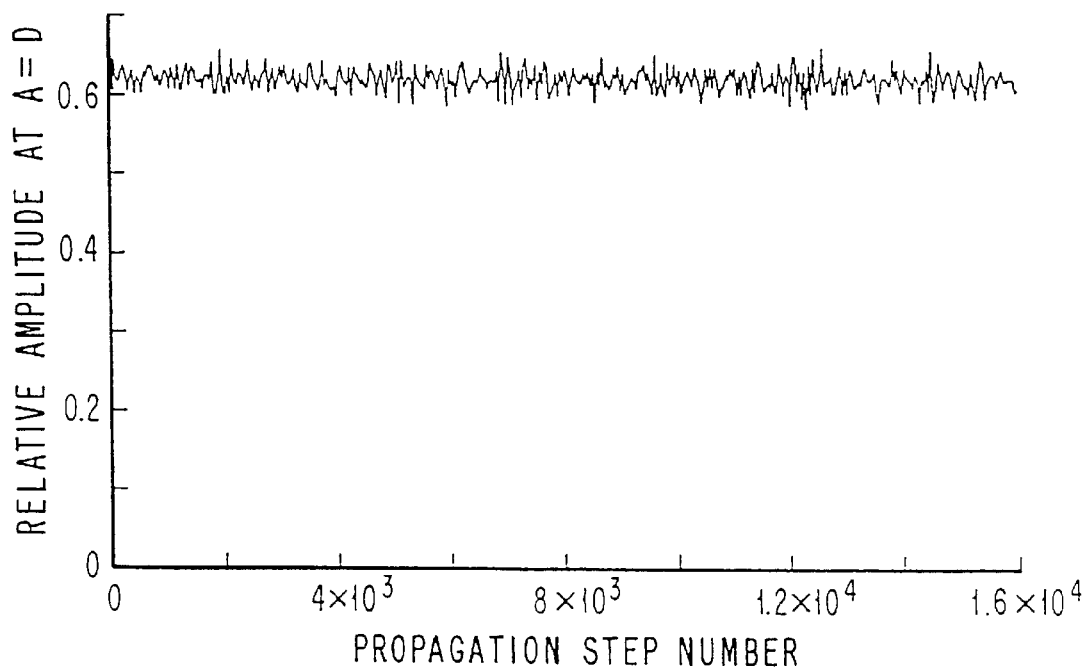
FIG. 10B is a plot of the average relative burst amplitudes obtained during the same experiment as shown in figure 10A illustrating the accuracy with which the track spacing is held constant.

Preferably, this process is repeated several times at the very beginning (in a region that will not be assigned to user data) to initially set the reference level to account for the particular read to write element offset. Changes in the offset due to rotation of the actuator can be accounted for by repeating the process at regular intervals. In experiments carried out with the system described above, excellent results were obtained by repeating this process every 40 propagation steps. The process was actually carried out by averaging the relative amplitudes at the A=D, B=E, and C=F locations. Also, only a fraction (¼) of the computed corrections to the reference level were applied each time to reduce the effects of noise. Since the reference level changes very slowly, there is an advantage to letting the corrections build up slowly as well. This measurement and correction process required 11 revolutions of the disk and was performed every 40 propagation steps (which take 120 revolutions since each step requires a write, a normalize and a step revolution), hence it increases the servowrite time by only about 9%. FIG. 10A shows the nominal average reference level plotted versus propagation step number for a full run of 16000 steps, and FIG. 10B shows a plot of the relative amplitudes at the A=D positions (averaged with B=E and C=F) measured in the same run. Here the track pitch was chosen to be smaller than that shown in FIG. 9 (the 25% space between written data tracks shown in the figure is actually higher than needed) so that the desired relative amplitude at the A=D position was set to 0.625 rather than 0.5. It can be seen that this method works quite well at holding the track spacing constant (as determined by the relative amplitude at the A=D position) by systematically adjusting the propagation nominal average reference level.

A number of variations of this method are possible. As already noted the desired relative amplitude at the A=D position may be set greater than 0.5 to achieve a tighter track spacing. Another variation is to use the A=E position, or A=C, or some other combination rather than A=D. The choice would depend on the ratio of the data track pitch to propagation track pitch and the desired spacing between tracks as well as the relative widths of the read and write elements. Referring to FIG. 9, note also that the choice of how many burst to use in the propagation pattern depends on these same factors. The key requirement is that the read element be able to read a particular burst without interference from the next burst over (the one in the same slot) several propagations tracks away.

WRITE ERROR CORRECTION

The use of special servo loop parameters (those that keep the closed loop response less than unity at all multiples of the disk rotation frequency) leads to great benefits in limiting the growth of errors in the propagation track shapes. Also, the track to track shape differences are kept low by operating the servo with parameters that provide fairly good rejection of mechanical disturbances resulting in low TMR. However, each track still contains some error due to TMR from such disturbances. By its nature the product servopattern is designed to encode relative head to disk position. Thus, a written-in error due to TMR during the servowrite process ultimately translates into a corresponding error in the radial position measurement obtained by the product servopattern demodulator during subsequent file operation. An additional feature of the present invention is a technique for reducing the effect of this residual TMR on the apparent shape of the product servopattern. Essentially, the idea is to use the PES of the propagation servo loop to modify the product servopattern as it is being written in a way that results in cancellation of the effect of the written-in position error when the servopattern is subsequently read back during file operation. The technique involves both the servowrite propagation process and the servopattern readback process during file operation. A preferred type of modification of the servopattern that is easily decoded by the disk file during operation and simply implemented in the servowriter is time shifting of the servopattern relative to the servo ID field.

Figure 12:
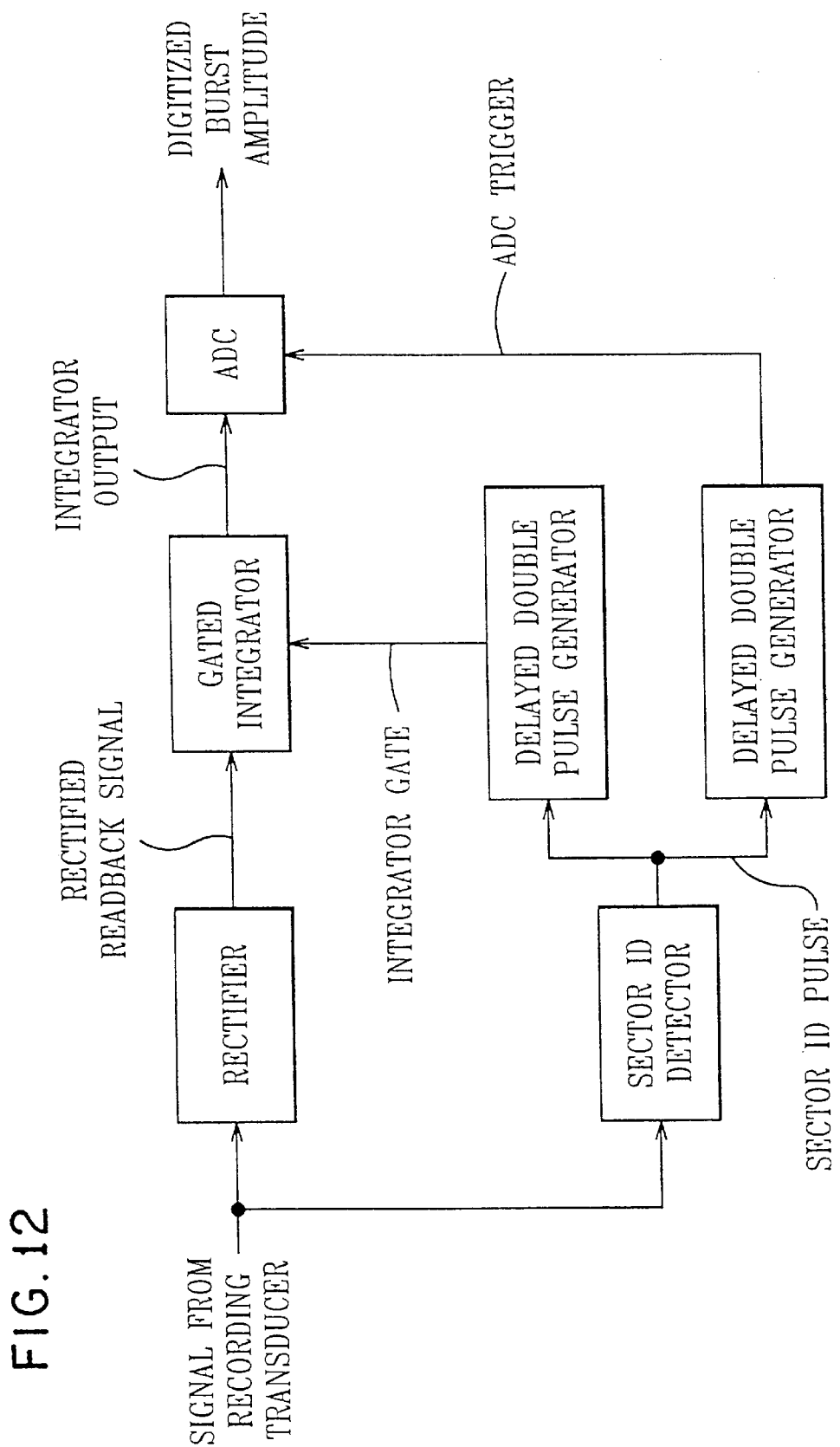
FIG. 12 is a block diagram showing the circuit elements associated with the gated integrator type of pattern demodulator.

As a first example of an embodiment of this process consider an amplitude burst product servopattern. In such a servopattern there are typically 2 or more bursts of written transitions detected within specific time slots following the servo ID field. FIG. 11A shows a simple two burst servo pattern in which the desired track location is defined as the location at which the readback signal from the A and B bursts are equal. In a conventional servopattern demodulator the readback amplitude is sampled and digitized near the end of each designated burst time slot and represents a filtered average of the burst amplitude. FIGS. 11B to 11F show waveforms associated with the demodulation technique of the present invention and FIG. 12 is a block diagram of the circuitry involved. The readback signal is detected by a rectification circuit as in a conventional demodulator but the output is run through a gated integrator circuit before being digitized by the ADC. The sector ID detector provides the timing reference from which the fixed integrator gate signals and ADC trigger signals are derived using delayed double pulse generators. The ADC is triggered to digitize the gated integrator output just prior to the falling edge of the gate. This gate edge serves to reset the integrator to zero as well. Thus, the digitized burst amplitude equals the rectified readback signal times the amount of time overlap between the integrator gate and the detected burst signal. The rectified readback amplitude changes with the radial location of the written burst so it tracks the TMR during the writing. By intentionally altering the time at which the burst is written relative to the sector ID, the amount of time overlap between the integrator gate and the detected burst signal can be adjusted so as to just cancel the effect of the TMR on the rectified amplitude, resulting in a digitized burst amplitude value that shows no effects from TMR during servowriting. The time of burst writing is adjustable through the use of a timing delay unit inserted in series with the write data from the pattern generator. A digitally programmable delay unit such as those manufactured by Data Delay Devices Corporation of 3 Mt. Prospect Ave., Clifton, N.J. provides the requisite rapid and precise adjustment of timing delay under digital control that is needed for this application.

The method for computing the proper delay is illustrated in FIGS. 13A to 13F which show a situation in which the A burst is radially mis-positioned due to random TMR during servowriting. In accordance with the present invention, the time at which the A burst is written is shifted relative to the end of the servo ID field. For simplicity, it is assumed that the readback signal varies perfectly linearly with off track position. Suppose the radial position error is a fraction f of the read element width and in the upward direction as shown in FIG. 13A. A good estimate of this radial position error is provided by the PES of the self-propagation servo loop as measured for the propagation burst region just preceding the product servopattern region in which burst A is written. For pattern propagation proceeding from the top down the pattern propagation burst (not shown in this figure) would have its lower edge coincident with the desired track location and an error in position in the upward direction would produce an increase in the readback amplitude of the propagation burst. This produces a PES reading equal to $-f$ since the PES is the fractional reference value minus the normalized readback amplitude. The product servopattern A burst normalized readback amplitude is shifted by $-f$ also, i.e. it is lower than it should be because the burst edge lies above the center of the recording transducer. This lowers the slope of the integrated signal. The integrator output signal at the time of the ADC trigger pulse (which corresponds to the digitized burst amplitude value) can be restored to its correct value by shifting the A burst later by an amount t given by $$t = \frac{PES \times T}{PES - V},$$

where T is the usual overlap time when no shift is applied and V is the rectified readback amplitude (normalized to the on-track signal) that is expected for no radial position error of burst A. V typically has the value 0.5 since the two burst servopattern would define data tracks at the locations where the A and B burst amplitudes are equal and the written burst edges are aligned as in FIG. 11A.

Errors in the B burst radial position can be cancelled in a similar manner but the time shift must be opposite to that employed for A burst. This arises from the fact that the upper edge of the B burst is used instead of the lower edge. Thus an upward position error during servowriting would increase the amplitude of the B burst detected by the product demodulator, and would require shifting the burst to an earlier time to compensate. This is easily accounted for by having the microprocessor sequence controller keep track of which burst type is being written and adjust the sign of the time shift accordingly.

A slightly more complicated situation arises if the product servopattern utilizes both edges of a given burst to define different track locations or for between-track position error determination. For example the lower edge of the A burst may be used to define one data track location (in conjunction with the upper edge of the B burst) while the upper edge of burst A is used to define an adjacent data track location (in conjunction with the lower edge of a different B burst). Writing the A burst later cancels the effect of the radial position error for the lower edge of the A burst but would double the error as seen at the upper edge of burst A. A solution is to shift the gate signals for these alternate edge locations so the gate starts before the burst and ends during it rather than starting during the burst and ending after it. Thus, shifting the A burst to a later time would reduce the overlap time between the gate and the detected burst amplitude signal. In this way, a unique shift applied to a burst during servowriting would serve to cancel radial position errors for either burst edge. The two gate delay times would be alternately selected by the disk file servopattern demodulator depending upon a pre-arranged assignment of burst edges to data tracks.

In the case of phase encoded servopatterns, the relative phase of the readback signal between two bursts is the position dependent quantity that is ultimately detected. An error in radial position therefore corresponds quite directly to a phase error in the detected pattern and can be cancelled quite simply by applying an appropriate time shift to one of the bursts during servowriting. No special modification to the product servopattern demodulator is required in this case.

Regardless of the product servopattern type, the error cancellation technique requires that a correction be applied to both the product servopattern and the amplitude burst propagation pattern at each step. If this is not done, the propagation servo loop will attempt to follow the written-in propagation pattern errors while writing the next step, so an an image of it will be transferred to all patterns (propagation bursts and product servopatterns) written on the next step. This is equivalent to having the errors appear again one step later. As mentioned previously, written-in errors behave just like modulation of the reference signal in the servo loop and the response to them is given by the closed loop response of the servo loop. Thus, the image that is carried forth to the next step is given by the closed loop response times the written-in error signals treated as a time waveform applied to the servo loop. A way to prevent this response to written-in errors is to adjust the reference table values to reflect the known position errors during writing so that each reference table value matches the expected amplitude for the corresponding burst when sensed by the read clement located directly on the desired propagation track. Just as in the case of the corrections to the product servopatterns the known position errors during writing are simply the PES readings of the pattern propagation servo loop during the write revolution. Referring to FIG. 4B, a mis-positioned propagation burst that causes a change in readback amplitude by an amount E changes the servo PES by an amount −E. If the reference track value R were increased from its nominal average value by the same amount E, the net result would be no change at all in the servo PES and therefore the written-in error would cause no actuator response at all. Referring to FIG. 4A and bearing in mind that the propagation proceeds in the downward direction, it can be seen that during the write of the mis-positioned burst the recording transducer was shifted too far down, resulting in a readback signal smaller than the desired value. Since the PES is the reference minus the position signal, the PES during the write would have been higher by an amount E. Thus, written-in errors can be eliminated from the propagation servopattern by adding the PES values obtained during the write revolution to the nominal average reference value to create the reference table values used on the next step.

A complication arises for written-in errors that appear systematically on each track such as written track width modulation due to angular variations in the recording medium or repeatable transducer flying height changes as might occur due to warping or tilting of the disk. In the preceding discussion of error compounding, it was pointed out that systematic errors undergo a bounded growth as a result of having a closed loop response near to but less than unity. In attempting to follow this absolute track non-circularity, a residual portion of the track shape error appears in the servo PES. The process described above for written-in error cancellation in which the PES is added to the nominal average reference value to create a new reference table interferes with the error compounding process and can lead to uncontrolled growth of systematic errors. The details of this interaction are very complicated, but there is a very simple solution that limits the growth. By adding only a fraction f (where f<1), of the PES to the nominal average reference level in computing the new reference table values, the growth of systematic errors is once again bounded. This reference table correction factor f operates in a manner similar to the closed loop response with regard to systematic error compounding and it enhances the net error by a factor of about $1/(1-f)$. The choice of f is determined by a trade-off between maintaining an acceptable level of absolute track non-circularity and the fact that the random track to track error cancellation is made less effective as f is reduced. Practically speaking it is found that an f of about 0.7 provides quite significant random error cancellation without increasing systematic error growth beyond acceptable levels.

In the alternative embodiment shown in FIG. 5 involving decoupling of the writing of the product servopattern, the PES used to modulate the product servopattern would not be the same as that used for computing the reference table corrections.

Other methods of modulating the product servopattern to allow random TMR cancellation beside those described above can be devised by those skilled in the art. Examples include modulating the frequency or the duration of amplitude burst patterns coupled with corresponding detection circuitry included in the product servopattern demodulator. The novel aspect of the present invention consists of using the real-time PES signal during servowriting to allow correction of servopattern position errors as they are written. The modification of the self-propagation reference table values based on the PES is also important for achieving the desired reduction in track to track random shape errors. This correction is fed forward in time for track following at a subsequent step so it differs substantially from previously described techniques for smoothing of the reference table values based on averaging the PES over several revolutions while track following. The purpose of the correction is also very different than anything described in the prior art since it is specifically designed to reduce random track to track errors and must be coupled to error cancellation in the product servopattern in order to be effective.

It will be understood that the present invention may be generalized to the writing patterns on a medium that moves repetitively. While such motion may constitute successive rotations of the medium as described above it may also constitute any repetitive motion including rectilinear and reciprocating motion. Thus, any medium may be decorated over an area using the self propagation principles described herein.

What is claimed is:

1. A method for determining the desired track pitch of tracks to be written on a storage medium of a storage device having a transducer, said method comprising:

choosing an initial nominal average reference value;

writing a transition on each of a plurality of said tracks, said plurality of tracks being less than a total number of said tracks, wherein spacing of said plurality of tracks is determined by said initial nominal average reference value;

measuring a first relative amplitude of the transition written on one track of said plurality tracks and a second relative amplitude of the transition written on another track of said plurality of tracks;

comparing said first relative amplitude and said second relative amplitude;

positioning said transducer based on said comparing;

repeating said measuring, comparing and positioning until said comparing indicates said first relative amplitude is substantially equal to said second relative amplitude, wherein a measured relative amplitude is obtained;

comparing said measured relative amplitude to a predetermined value to obtain a deviation from said predetermined value; and determining a second nominal average reference value using said deviation, said second nominal average reference value being used to write subsequent tracks at said desired track pitch.

2. The method of claim 1, wherein said transducer comprises a separate read element and write element.

3. The method of claim 1, wherein said determining comprises subtracting a fraction of said deviation from said initial nominal average reference value to obtain said second nominal average reference value.

4. The method of claim 1, wherein said predetermined value corresponds to a desired gap between said tracks to be written.

5. The method of claim 1, wherein said measured relative amplitude is equal to a sum of said relative amplitude of the transition written on said one track and said relative amplitude of the transition written on said another track.

6. An apparatus for determining the desired track pitch of tracks to be written on a storage medium of a storage device having a transducer, said apparatus comprising:

means for choosing an initial nominal average reference value;

a pattern generator adapted to write a transition on each of a plurality of said tracks, said plurality of tracks being less than a total number of said tracks, wherein spacing of said plurality of tracks is determined by said initial nominal average reference value;

means for measuring a first relative amplitude of the transition written on one track of said plurality tracks and a second relative amplitude of the transition written on another track of said plurality of tracks;

means for comparing said first relative amplitude and said second relative amplitude;

means for positioning said transducer based on said comparing;

means for repeating said measuring, comparing and positioning until said comparing indicates said first relative amplitude is substantially equal to said second relative amplitude; wherein a measured relative amplitude is obtained;

means for comparing said measured relative amplitude to a predetermined value to obtain a deviation from said predetermined value; and means for determining a second nominal average reference value using said deviation, said second nominal average reference value being used to write subsequent tracks at said desired track pitch.

7. The apparatus of claim 6, wherein said transducer comprises a separate read element and write element.

8. The apparatus of claim 6, wherein said means for determining comprises a subtracter adapted to subtract a fraction of said deviation from said initial nominal average reference value to obtain said second nominal average reference value.

9. The apparatus of claim 6, wherein said predetermined value corresponds to a desired gap between said tracks to be written.

10. The apparatus of claim 6, wherein said measured relative amplitude is equal to a sum of said relative amplitude of the transition written on said one track and said relative amplitude of the transition written on said another track.

11. A pattern propagation method in a storage device, said storage device comprising a storage medium and a transducer for interacting with said storage medium, said method comprising:

writing, during a write revolution of said storage medium, a transition on said storage medium while servoing on another transition previously recorded on said storage medium;

determining, during said write revolution, a position error signal corresponding to a position error of said transducer relative to said another transition; and storing, during said write revolution, said position error signal providing a recorded position error signal used in computing a reference track value associated with said transition to correct for said position error.

12. The method of claim 11, wherein said position error signal corresponds to a substantially instantaneous determination of said position error.

13. The method of claim 11, further comprising computing said reference track value, said computing comprising adding a predetermined fraction of said recorded position error signal to a prespecified nominal average reference level to obtain said reference track value.

14. The method of claim 13, further comprising recording said reference track value.

15. The method of claim 13, further comprising stepping out to a new radial position using said reference track value and further comprising repeating said writing, determining and recording for a plurality of transitions to be written at said new radial position.

16. The method of claim 15, further comprising repeating said computing, stepping out, writing, determining and recording for a plurality of radial positions of said storage medium.

17. The method of claim 11, further comprising iteratively repeating said writing, determining and storing, during said write revolution, until a plurality of transitions are written at a radial position of said storage medium.

18. A pattern propagation apparatus in a storage device, said storage device comprising a storage medium and a transducer for interacting with said storage medium, said apparatus comprising:

a pattern generator adapted to write, during a write revolution of said storage medium, a transition on said storage medium while servoing on another transition previously recorded on said storage medium;

means for determining, during said write revolution, a position error signal corresponding to a position error of said transducer relative to said another transition; and a memory adapted to store, during said write revolution, said position error signal providing a recorded position error signal used in computing a reference track value associated with said transition to correct for said position error.

19. The apparatus of claim 18, wherein said position error signal corresponds to a substantially instantaneous determination of said position error.

20. The apparatus of claim 18, further comprising a controller programmable to compute said reference track value, said controller comprising means for adding a predetermined fraction of said recorded position error signal to a prespecified nominal average reference level to obtain said reference track value.

* * * * *